United States Patent
Min

(10) Patent No.: US 10,115,370 B2
(45) Date of Patent: Oct. 30, 2018

(54) USER TERMINAL DEVICE AND CONTROL METHOD THEREOF

(71) Applicant: SAMSUNG ELECTRONICS CO., LTD., Suwon-si (KR)

(72) Inventor: Hyun-suk Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 13/858,275

(22) Filed: Apr. 8, 2013

(65) Prior Publication Data

US 2013/0265261 A1    Oct. 10, 2013

(30) Foreign Application Priority Data

Apr. 8, 2012 (KR) .................... 10-2012-0036470

(51) Int. Cl.
- *G09G 5/00* (2006.01)
- *G01C 21/36* (2006.01)
- *G06F 3/048* (2013.01)

(52) U.S. Cl.
CPC ......... *G09G 5/006* (2013.01); *G01C 21/3664* (2013.01); *G06F 3/048* (2013.01)

(58) Field of Classification Search
CPC ...... G09G 5/006; G09G 5/00; G01C 21/3664; G01C 21/36
See application file for complete search history.

(56) References Cited

U.S. PATENT DOCUMENTS

| | | | |
|---|---|---|---|
| 6,208,932 B1 * | 3/2001 | Ohmura | G01C 21/365 340/988 |
| 7,957,883 B2 | 6/2011 | Oh et al. | |
| 7,983,840 B2 * | 7/2011 | Pair | G01C 21/36 342/357.31 |
| 8,381,985 B2 | 2/2013 | Ferren et al. | |
| 8,439,265 B2 | 5/2013 | Ferren et al. | |
| 8,700,012 B2 | 4/2014 | Ferren et al. | |
| 8,700,102 B2 | 4/2014 | Ferren et al. | |
| 8,820,644 B2 | 9/2014 | Ferren et al. | |
| 8,904,164 B2 | 12/2014 | Ferren | |

(Continued)

FOREIGN PATENT DOCUMENTS

| | | |
|---|---|---|
| CN | 102393808 A | 3/2012 |
| DE | 19961376 A1 | 6/2001 |

(Continued)

OTHER PUBLICATIONS

International Search Report dated Aug. 27, 2013, issued by the International Searching Authority in counterpart International Application No. PCT/KR2013/002934.

(Continued)

*Primary Examiner* — Mihir K Rayan
(74) *Attorney, Agent, or Firm* — Sughrue Mion, PLLC

(57) ABSTRACT

A handheld user device and a control method thereof are provided, the user terminal device includes a first user interface, a second user interface, a sensing device which senses an operating condition of the handheld user device, a controller which enables the first user interface and disables the second user interface if the operating condition corresponds to a first condition and enables the second user interface and disables the first user interface if the operating condition corresponds to a second condition.

26 Claims, 27 Drawing Sheets

(56) References Cited

U.S. PATENT DOCUMENTS

| | | | |
|---|---|---|---|
| 8,909,915 B2 | 12/2014 | Ferren | |
| 8,943,581 B2 | 1/2015 | Ferren | |
| 9,013,423 B2 | 4/2015 | Ferren | |
| 9,134,804 B2 | 9/2015 | Ferren | |
| 9,134,805 B2 | 9/2015 | Ferren et al. | |
| 9,141,199 B2 | 9/2015 | Ferren et al. | |
| 9,171,141 B2 | 10/2015 | Ferren | |
| 9,195,816 B2 | 11/2015 | Ferren et al. | |
| 9,195,818 B2 | 11/2015 | Ferren | |
| 9,330,322 B2 | 5/2016 | Ferren | |
| 9,378,501 B2 | 6/2016 | Ferren | |
| 2005/0154798 A1* | 7/2005 | Nurmi | G06F 1/1626 710/1 |
| 2005/0172226 A1* | 8/2005 | Kobashi et al. | 715/518 |
| 2005/0179647 A1* | 8/2005 | Simmons | G06F 3/023 345/156 |
| 2005/0283532 A1* | 12/2005 | Kim | H04L 12/2803 709/225 |
| 2006/0250226 A1 | 11/2006 | Vogel et al. | |
| 2007/0026850 A1* | 2/2007 | Keohane | H04M 1/6075 455/418 |
| 2007/0124043 A1* | 5/2007 | Ayoub | G06F 21/10 701/36 |
| 2008/0005679 A1* | 1/2008 | Rimas-Ribikauskas | G01C 21/3688 715/745 |
| 2008/0077865 A1* | 3/2008 | Hiles | G06F 3/0481 715/708 |
| 2009/0100384 A1* | 4/2009 | Louch | G06F 1/1626 715/863 |
| 2009/0259397 A1 | 10/2009 | Stanton | |
| 2010/0016014 A1* | 1/2010 | White | H04M 1/22 455/556.1 |
| 2010/0048222 A1* | 2/2010 | Gracieux | H04L 63/107 455/456.1 |
| 2010/0060549 A1* | 3/2010 | Tsern | G06F 3/1415 345/2.1 |
| 2010/0216509 A1* | 8/2010 | Riemer | H04M 1/72577 455/557 |
| 2011/0116685 A1* | 5/2011 | Sugita | H04N 5/23219 382/103 |
| 2011/0117902 A1* | 5/2011 | Chang | H04W 4/02 455/418 |
| 2011/0137440 A1* | 6/2011 | Ni | H04M 1/72522 700/94 |
| 2011/0167365 A1* | 7/2011 | Wingrove | G06F 3/0482 715/765 |
| 2011/0224897 A1 | 9/2011 | Tan | |
| 2011/0306304 A1 | 12/2011 | Forutanpour et al. | |
| 2012/0001843 A1 | 1/2012 | Gravino | |
| 2012/0074227 A1 | 3/2012 | Ferren et al. | |
| 2012/0075194 A1 | 3/2012 | Ferren | |
| 2012/0075452 A1 | 3/2012 | Ferren | |
| 2012/0079265 A1 | 3/2012 | Ferren | |
| 2012/0095643 A1* | 4/2012 | Bose | B60K 37/00 701/32.8 |
| 2012/0118971 A1 | 5/2012 | Ferren et al. | |
| 2012/0118972 A1 | 5/2012 | Ferren et al. | |
| 2012/0118973 A1 | 5/2012 | Ferren et al. | |
| 2012/0120301 A1 | 5/2012 | Ferren et al. | |
| 2012/0157127 A1 | 6/2012 | Ferren et al. | |
| 2012/0190408 A1 | 7/2012 | Ferren et al. | |
| 2012/0268405 A1 | 10/2012 | Ferren et al. | |
| 2012/0268581 A1 | 10/2012 | Ferren | |
| 2012/0270575 A1 | 10/2012 | Ferren et al. | |
| 2012/0270601 A1 | 10/2012 | Ferren et al. | |
| 2012/0272313 A1 | 10/2012 | Ferren | |
| 2012/0276932 A1 | 11/2012 | Ferren et al. | |
| 2013/0019321 A1 | 1/2013 | Ferren | |
| 2013/0028444 A1* | 1/2013 | Hsu et al. | 381/107 |
| 2013/0106699 A1* | 5/2013 | Babatunde | G06F 3/0233 345/168 |
| 2014/0181715 A1* | 6/2014 | Axelrod | G06F 3/0487 715/771 |
| 2014/0247221 A1 | 9/2014 | Ferren | |
| 2014/0247222 A1 | 9/2014 | Ferren | |
| 2015/0150121 A1 | 5/2015 | Ferren | |
| 2016/0026884 A1 | 1/2016 | Ferren | |
| 2016/0034901 A1 | 2/2016 | Ferren | |

FOREIGN PATENT DOCUMENTS

| | | | |
|---|---|---|---|
| EP | 2305506 A1 | 4/2011 | |
| KR | 1020040050749 A | 6/2004 | |
| KR | 10-2010-0051155 A | 5/2010 | |
| KR | 101055703 B1 | 8/2011 | |
| WO | 2005002901 A1 | 1/2005 | |
| WO | 2008077058 A1 | 6/2008 | |

OTHER PUBLICATIONS

Written Opinion dated Aug. 27, 2013, issued by the International Searching Authority in counterpart International Application No. PCT/KR2013/002934.

Extended European Search Report dated Aug. 23, 2013, issued by the European Patent Office in counterpart European Application No. 13162752.3.

Communication dated Aug. 16, 2014 issued by the Australian IP Office in counterpart Australian Application No. 2013203009.

"MyFord Touch Handbook"; Ford Motor Company; 25 pages total, Apr. 2011.

Communication dated Dec. 5, 2014 by the Australian Patent Office in related application No. 2013203009, 2 pages.

Communication dated Jan. 5, 2016, issued by the European Patent Office in counterpart European Application No. 13162752.3.

Communication dated Jul. 5, 2016, issued by the State Intellectual Property Office of P.R. China in counterpart Chinese application No. 201380018984.X.

Communication dated Mar. 1, 2017, issued by the State Intellectual Property Office of P.R. China in counterpart Chinese Application No. 201380018984.X.

Communication dated Apr. 6, 2017, issued by the European Patent Office in counterpart European Application No. 17157990.7.

Communication dated Mar. 21, 2018, issued by the State Intellectual Property Office of P.R. China in counterpart Chinese application No. 201380018984.X.

Communication dated Aug. 17, 2017, issued by the State Intellectual Property Office of People's Republic of China in counterpart Chinese Application No. 201380018984.X.

* cited by examiner (a)

(d)　　　(e)　　　(f) ORCHARD ROAD (a)   (b)

(c)   (d)

(a)

(b)

(a)

(b)

USER TERMINAL DEVICE AND CONTROL METHOD THEREOF

CROSS-REFERENCE TO RELATED APPLICATIONS

This application claims priority from Korean Patent Application No. 10-2012-0036470, filed on Apr. 8, 2012, in the Korean Intellectual Property Office, the disclosure of which is incorporated herein by reference in its entirety.

BACKGROUND

1. Field

Apparatuses and methods consistent with exemplary embodiments relate to a user terminal device and a control method thereof, and more specifically, to a user terminal device having improved user accessibility and convenience features and a control method thereof.

2. Description of the Related Art

With advancements of electronics technology, various types of electronic devices have been developed and are now available for anyone to use. Accordingly, continuing studies are directed toward helping users operate such diverse electronic devices in more efficient ways.

For instance, different types of electronic equipment are mounted on all kinds of moving objects for use. One typical example of this is a navigation device. The navigation device is a device that recognizes the current location of a vehicle, and informs a user of a route to the destination, which is obtained based on given map information. Recently, a mobile terminal device is being used as a navigation device as well. This creates a problem in that the navigation device, when used while driving, might distract a driver from driving, which can increase the possible risk of accidents. Therefore, there is a need to lower the risk of accidents for any driver who operates a moving object.

In addition, modern electronic devices support diverse functions. These functions can be selected and executed by different types of input, including for example voice, touch, motion, etc. However, these input methods have an issue as they do not necessarily consider the user's present condition and ability to access the input methods. As such, new schemes are needed to improve the accessibility and convenience of different types of electronic devices.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

One or more exemplary embodiments provide a user terminal having an improved user convenience, in which an input mode of the user terminal device is switched based on the information about the moving state of a moving object in which the user terminal device is placed; and a control method thereof.

One or more exemplary embodiments also provide a user terminal device having an improved user convenience, in which option information set in the user terminal device are switched based on the information about the moving state of a moving object in which the user terminal device is placed; and a control method thereof.

One or more exemplary embodiments also provide a user terminal device having an improved user convenience, in which user interface modes set in the user terminal device are switched based on the user profile information of a user who operates the user terminal device; and a control method thereof.

One or more exemplary embodiments also provide a user terminal device having an improved user convenience, in which GUI information set in the user terminal device are switched based on at least one of the information about the moving state of a moving object and the information about surroundings of the moving object; and a control method thereof.

According to an aspect of an exemplary embodiment, there is provided a handheld user device including: a first user interface; a second user interface; a sensing device which senses an operating condition of the handheld user device; and a controller which enables the first user interface and disables at least the second user interface if the operating condition corresponds to a first condition and enables the second user interface and disables at least the first user interface if the operating condition corresponds to a second condition. The operating condition may be at least one of an external operating environment of the handheld user device and a motion of the handheld user device.

The handheld user device may also include a third user interface. The controller may enable two of the first user interface, the second user interface and the third user interface and disable a remaining user interface if the operating condition corresponds to the first condition and enable another two of the first user interface, the second user interface and the third user interface and disable another remaining user interface if the operating condition corresponds the second condition.

The handheld user device may also include a communication unit which receives information about the external operating environment from an external device.

The external operating environment of the handheld user device may be at least one of a speed of a moving object, movement of a moving object, noise in a moving object, and brightness in a moving object.

The first user interface may be one of a voice input, a touch input, an eye tracking input, a touch-less motion input and an external device input, and the second user interface may be one of a voice input, a touch input, an eye tracking input, a touch-less motion input and an external device input.

The third user interface may be one of a voice input, a touch input, an eye tracking input, a touch-less motion input and an external device input.

The handheld user device may also include a display unit which displays the first user interface if the first user interface is enabled or displays the second user interface if the second user interface is enabled. The first user interface may include a first graphical user interface element and the second user interface may include a second graphical user interface element larger than the first user interface element.

The handheld user device may also include a display unit which displays the first user interface if the first user interface is enabled or displays the second user interface if the second user interface is enabled. The first user interface may include a first screen of a first brightness and the second user interface may include a second screen of a second brightness different from the first screen brightness.

The first user interface may output a sound having a first volume, and the second user interface may output a sound having a second volume different from the first volume.

The handheld user device may also a display unit which displays the first user interface if the first user interface is enabled or displays the second user interface if the second user interface is enabled. The first user interface may include a first layout including a plurality of graphical user interface elements and the second user interface may include a second layout comprising only most frequently used graphical user interface elements from among the plurality of graphical user interface elements.

The handheld user device may also include a display unit which displays a window where the first user interface, the second user interface and the third user interface are assigned a priority level. The controller may further disable one of the two enabled user interfaces based on the priority level.

The operating environment of the handheld device may include at least one of a condition indicating the handheld device is attached to a moving object, a condition indicating the handheld device is inside of a moving object, and a condition indicating the handheld device is moving along with a moving object.

The handheld user device may also include a communication unit which receives user settings through short-range wireless communication. The first condition and the second condition may be determined based upon the received user settings.

The controller may detect an override command of a user in response to the controller enabling the first user interface or the second user interface, generate pattern data corresponding to the override command of the user; and modify the first condition and the second condition based upon the pattern data.

According to an aspect of another exemplary embodiment, there is provided a control method of a handheld device, the control method including: sensing an operating condition of the handheld user device, enabling a first user interface and disabling at least a second user interface if the operating condition corresponds to a first condition, and enabling the second user interface and disabling the first user interface if the operating condition corresponds to a second condition. The operating condition is at least one of an external operating environment of the handheld user device and a motion of the handheld user device.

The enabling a first user interface may further include enabling two of the first user interface, the second user interface and a third user interface and disabling a remaining user interface if the operating condition corresponds to the first condition. The enabling a second user interface may further include enabling another two of the first user interface, the second user interface and the third user interface and disabling another remaining user interface if the operating condition corresponds the second condition.

The control method may also include receiving information about the external operating environment from an external device.

The external operating environment of the handheld user device may include at least one of a speed of a moving object, movement of a moving object, noise in a moving object, and brightness in a moving object.

The first user interface may include one of a voice input, a touch input, an eye tracking input, a touch-less motion input and an external device input and the second user interface may include one of a voice input, a touch input, an eye tracking input, a touch-less motion input and an external device input.

The third user interface may include one of a voice input, a touch input, an eye tracking input, a touch-less motion input and an external device input.

The control method may also include displaying the first user interface if the first user interface is enabled or the second user interface if the second user interface is enabled. The first user interface may include a first graphical user interface element and the second user interface may include a second graphical user interface element user interface element larger than the first user interface element.

The control method may also include displaying the first user interface if the first user interface is enabled or the second user interface if the second user interface is enabled. The first user interface may include a first screen having a first brightness and the second user interface may include a second screen having a second brightness different from the first screen brightness.

The first user interface may output a sound having a first speaker volume and the second user interface may output a sound having a second speaker volume different from the first speaker volume.

The control method may also include displaying the first user interface if the first user interface is enabled or the second user interface if the second user interface is enabled. The first user interface may include a first layout comprising a plurality of graphical user interface elements and the second user interface may include a second layout including only most frequently used graphical user interface elements from among the plurality of graphical user interface elements.

The control method may also include displaying a window where the first user interface, the second user interface and the third user interface are assigned a priority level and disabling one of the two enabled user interfaces based on the priority level.

The operating environment of the handheld device may include at least one of a condition indicating the handheld device is attached to a moving object, a condition indicating the handheld device is inside of a moving object, and a condition indicating the handheld device is moving along with a moving object.

The control method may also include receiving user settings through short-range wireless communication. The first condition and the second condition may be determined based upon the received user settings.

The control method may also include detecting an override command of a user in response to the controller enabling the first user interface or the second user interface, generating pattern data corresponding to the override command of the user, storing the pattern data, and modifying the first condition and the second condition based upon the pattern data.

BRIEF DESCRIPTION OF THE DRAWING

The above and/or other aspects will be more apparent by describing certain exemplary embodiments with reference to the accompanying drawings, in which:

FIG. 6 illustrates an input mode setup UI according to an exemplary embodiment.

DETAILED DESCRIPTION OF EXEMPLARY EMBODIMENTS

Figure 1:
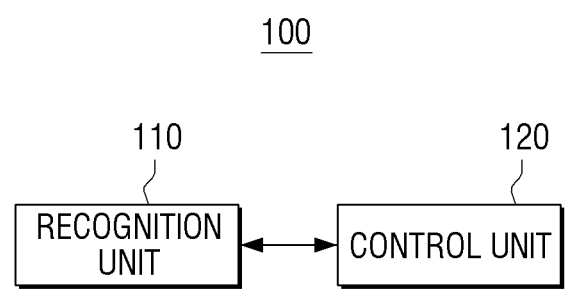
FIG. 1 is a block diagram showing a user terminal device according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

FIG. 1 is a block diagram showing a user terminal device according to an exemplary embodiment. Referring to FIG. 1, a user terminal device 100 includes one or more of a recognition unit 110 and a controller 120. The user terminal device 100 can be a navigation device, a mobile terminal device, a personal digital assistant (PDA) or a personal computer (PC_ which can display a moving state of a moving object.

The recognition unit 110 recognizes user inputs. The user inputs can include at least one of a user touch input, a user voice input, a user motion input, an input based on the movement of a user's pupil, an input based on the brain waves of a user and an input from another user terminal device.

Specifically, the recognition unit 110 can recognize each input signal from different input types. For example, when the input mode of the user terminal device 100 is configured to receive input in a first input mode, the recognition unit 110 can recognize a user input corresponding to the first input mode and when the input mode of the user terminal device 100 is configured to receive input in a second input mode, the recognition unit 110 can recognize a user input corresponding to the second input mode.

The input mode may be the mode that the user terminal device recognizes at least one of a user touch input, a user voice input, a user motion input, an input based on the movement of a user's pupil, an input based on the brain waves of a user and an input from other user terminal device and disregards or rejects other types of inputs. For example, when the first input mode is the mode that recognizes a user touch input and a user voice input and the second input mode is the mode that recognizes a user voice input, the recognition unit 110 can recognize only the user touch input and the user voice input as the control inputs for the user terminal device 100 in the first input mode and only the user voice input as the control inputs for the user terminal device 100 in the second input mode by the control of a controller 120 as described below.

The recognition unit 110 can include at least one of a touch input recognizer that recognizes a user touch input, a voice input recognizer that recognizes a user voice input, a motion input recognizer that recognizes a user motion input, a pupil input (e.g., eye tracking, etc.) recognizer that recognizes an input based on the movement of a user's pupil, a brain waves input recognizer that recognizes an input based on the brain waves of a user and another device input recognizer that recognizes an input from other user terminal device. More details will be provided below with reference to FIG. 2.

A controller 120 controls the overall operations for the user terminal device 100. Particularly, the controller 120 can switch the input modes of the user terminal device based on the information about the moving state of a moving object in which the user terminal device 100 is placed and perform an operation based on the input signals by the method corresponding to the switched input mode. More details on the operations of the control unit 120 will be provided below with reference to FIG. 2.

Figure 2:
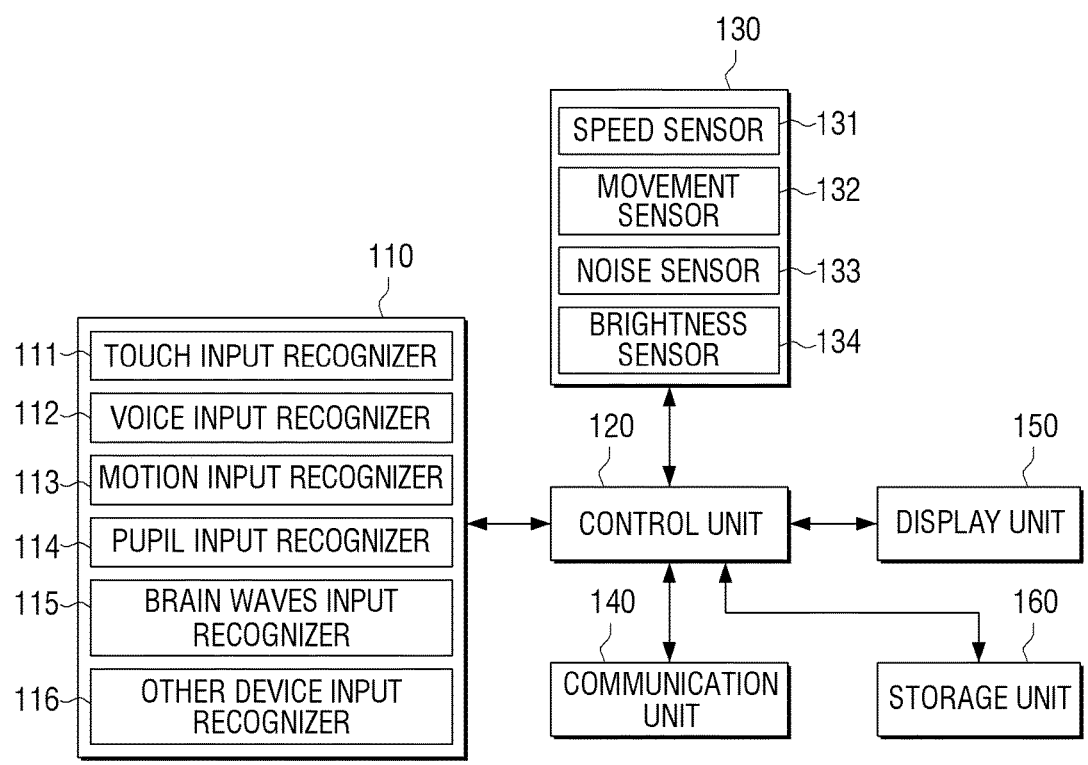
FIG. 2 is a block diagram showing the user terminal device of FIG. 1 in detail.

FIG. 2 is a block diagram showing the user terminal device of FIG. 1 in detail. Referring to FIG. 2, the user terminal device 100 includes one or more of a recognition unit 110, a controller 120, a sensor unit 130, a communication unit 140, a display unit 150 and a storage unit 160.

The recognition unit 110 can include at least one of a touch input recognizer 111 that recognizes a user touch input, a voice input recognizer 112 that recognizes a user voice input, a motion input recognizer 113 that recognizes a user motion input, a pupil input recognizer 114 that recognizes an input based on the movement of a user's pupil, a brain waves input recognizer 115 that recognizes an input based on the brain waves of a user and another device input recognizer 116 that recognizes an input from other user terminal device.

In particular, the touch input recognizer 111 accepts a user touch input. The touch input recognizer 111 also switches the input touch signals to electric signals and outputs them to the controller 120. Herein, the touch input recognizer 111 can be implemented as a touch panel. The touch input recognizer 111 can also be an all-in-one device coupled with the display unit 150 of the user terminal device 100 or separated therefrom. The separated touch input recognizer 111 can be connected to the user terminal device 100.

In particular, the voice input recognizer 112 takes a voice input of a user which may include commands spoken by the user. The voice input recognizer 112 also switches the input voice signals to electric signals and outputs them to the controller 120. Herein, the voice input recognizer 112 can be implemented as a microphone. The voice input recognizer 112 can also be an all-in-one device coupled with the user terminal device 100 or separated therefrom. The separated voice input recognizer 112 can be connected to the user terminal device 100.

The motion input recognizer 113 takes image signals (e.g. sequential frames) picked up from a user motion and provides them to the controller 120. The motion input recognizer 113 may comprise a lens and an image sensor, an infrared sensor or camera, an accelerometer, a gyroscope, etc. The motion input recognizer 113 can also be an all-in-one device coupled with the user terminal device 100 or separated therefrom. The separated motion input recognizer 113 can be connected to the user terminal device 100.

The pupil input recognizer 114 takes image signals (e.g. sequential frames) picked up from a user motion and provides them to the controller 120. The pupil input recognizer 114 can include and consist of a forward-looking camera that is configured and arranged in such a way that the shooting direction thereof faces the direction that a user is looking at; and at least one infrared camera arranged in an appropriate form in order to obtain the images of one or both of the user's eyes. Also, depending on the embodiments, the pupil input recognizer 114 can further include a reflector that has a feature of transmitting visible rays and reflecting infrared rays to obtain the images of one or both of the user's eyes, the rays not disturbing the user's eyes. Also, pupil input recognizer 114 can be an all-in-one device coupled with the user terminal device 100 or separated therefrom. The separated pupil input recognizer 113 can be connected to the user terminal device 100.

The brain waves input recognizer 115 takes brain waves signals and provides them to the controller 120. The brain waves input recognizer 115 can include a brain waves sensing electrode that senses a user's brain waves. The brain waves sensing electrode can include at least one of an alpha electrode detecting brain waves in a range between 8 and 13 Hz; a beta electrode detecting brain waves in a range between 13 and 30 Hz; a gamma electrode detecting brain waves in a range between 30 and 50 Hz; a delta electrode detecting brain waves in a range between 0 and 4 Hz; a theta electrode detecting brain waves in a range between 4 and 8 Hz. Also, depending on the embodiments, the brain waves input recognizer 115 can further include a filtering part that filters the detected brain waves, an amplifier that amplifies the filtered brain waves, and an A/D converter. The brain waves input recognizer 115 can also be an all-in-one device coupled with the user terminal device 100 or separated therefrom. The separated brain waves input recognizer 115 can be connected to the user terminal device 100.

The other device input recognizer 116 takes inputs from other user terminal devices and provides them to the controller 120. The other user terminal devices can be implemented as a mobile terminal device, a PDA, a PC or a remote controller, etc. which can provide control signals to be able to control the user terminal device 100.

The sensor unit detects information about the moving state of a moving object. The moving object can be any object that moves. For example, it can be a non-human object such as an automobile, a bus, a ship, a train or a motorcycle, or a human object such as a person. The moving object may also be the user terminal device itself. Also, the information about the moving state can include at least one of moving speed of the object, shaking of the moving object, noise in the moving object and brightness in the moving object.

The sensor unit 130 can include at least one of a speed sensor 131 that detects the speed of the moving object, a shaking sensor 132, a noise sensor 133 and a brightness sensor 134.

Particularly, the speed sensor 131 detects the speed of the moving object and provides the detected signals to the controller 120. The speed sensor 131 can consist of GPS data receiving module. Accordingly, the speed sensor 131 can detect the speed of the moving object using the received GPS data (e.g. latitude or longitude data of the moving object) and provide the detected speed to the controller 120.

Also, the shaking sensor 132 detects the shaking of a moving object and provides the detected signals to the controller 120. The shaking sensor 132 can be implemented as a gyroscope sensor and/or an acceleration sensor. Accordingly, the shaking sensor 132 can detect the shaking (gradient change relative to a reference axis) of the moving object and provide the detected shaking to the controller 120.

Also, the noise sensor 133 detects the noise of a moving object and provides the detected signals to the controller 120. The noise sensor 133 can be implemented as a noise vibration sensor, a microphone or and an accelerometer sensor, etc. Accordingly, the noise sensor 133 can detect the noise of the moving object and provide the detected noise to the controller 120.

The brightness sensing part 134 detects the brightness in a moving object and provides the detected signals to the controller 120. The brightness sensor 134 can be implemented as a light sensor. Accordingly, the brightness sensor 134 can detect the brightness in the moving object and provide the detected brightness to the controller 120.

The communication unit 140 connects the user terminal device 100 with external equipment. Thus, the user terminal device 100 can receive various information needed to operate the user terminal device 100, update information to update the user terminal device 100, and the like. For example, it can receive update information for the map displayed on the user terminal device 100 and update information for the firmware of the user terminal device 100 through the communication unit 140.

Additionally, the information about the moving state can be received from external equipment through the communication unit. The external equipment can be a device that includes at least one of a speed sensor, a shaking sensor, a noise sensor and a brightness sensor.

Accordingly, when the user terminal device 100 does not have one or more of the configurations included in the sensor unit 130, the user terminal device 100 can be provided with the information about the moving state of the moving object using the information about the moving state received through the communication unit 140. For example, when the sensor unit 130 of the user terminal device 100 has only the speed sensor 131, the user terminal device 100 can be aware of the information about the moving state of the moving object using the movement information of the moving object, the noise information of the moving object and brightness information in the moving object, which are received from external equipment.

The communication unit 140 allows the user terminal device 100 to connect to external equipment using a wireless or wired connection via Local Area Network (LAN) and/or Internet, a connection through Universal Serial Bus (USB) port, a connection through mobile communication such as 3G and 4G, a connection through short-range wireless communication such as Near Field Communication (NFC), Radio Frequency Identification (RFID), etc.

The display unit 150 displays user interface (UI) windows that allow users to configure and select various functions supported by the user terminal device 100.

Particularly, the display unit 150 can display a UI window in order to configure the input mode of the user terminal device 100.

Additionally, if there is a plurality of the user input methods corresponding to the input mode, the display unit 150 can take the input method and display a UI window to prioritize the input methods.

The display unit 150 can be implemented as at least one of a liquid crystal display, a thin film transistor-liquid crystal display, an organic light-emitting diode, a flexible display and a 3D display.

The storage unit 160 serves to store various programs and data needed to operate the user terminal device 100. In particular, the storage unit 160 can store the preset conditions needed to switch the input modes of the user terminal device 100, the conditions being mapped to a plurality of input modes. Also, the storage unit 160 can store a plurality of input modes and user input methods corresponding to each of the input modes.

Additionally, the storage unit 160 can include a touch database, a voice database, a motion database, a pupil input database, a brain waves database and another device information database. The touch database may be a database where touch input types and touch tasks are matched and recorded. The voice database may be a database where voice commands and voice tasks are matched and recorded. The motion database may be a database where motion inputs and motion tasks are matched and recorded. The pupil input database may be a database where pupil inputs and pupil input tasks are matched and recorded. The brain waves database may be a database where brain wave inputs and brain waves tasks are matched and recorded.

The storage unit 160 can be implemented as a built-in storage element such as a Random Access Memory (RAM), a flash memory, a Read Only Memory (ROM), an Erasable Programmable ROM (EPROM), an Electronically Erasable and Programmable ROM (EEPROM), a register, a hard disc, a removable disc, a memory card, etc. as well as a detachable storage element such as a USB memory, a CD-ROM, etc.

The controller 120 can control one or more of the recognition unit 110, the sensor unit 130, the communication unit 140, the display 150 and the storage unit 160.

Particularly, when a touch is input through the touch input recognizer 111, the controller 120 can control the user terminal device 100 to operate the functions corresponding to the input touch recognition unit 110.

When a voice is input through the voice input recognizer 112, the controller 120 can control the user terminal device 100 to operate the functions corresponding to the input voice. Based on the form of voice input, the voice recognition is classified into isolated word recognition which classifies each word and recognizes the uttered voice; continuous speech recognition which recognizes continuous words, continuous sentences and conversation voices; and keyword spotting as an intermediate form between the isolated word recognition and continuous speech recognition, which detects and recognizes preset keywords. When a user voice is input, the controller 120 detects the beginning and end of the uttered voice in the input voice signals and determines a voice section. The controller 120 can measure the energy of the input voice signals, classify the energy level of the voice signals based on the measured energy, and then detect the voice section through a dynamic programming. The controller 120 produces phoneme data by detecting phonemes (the smallest part of a voice) in the voice signals within the detected voice section based on Acoustic Model. The controller 120 then produces text data by applying HMM (Hidden Markov Model) probability model to the produced phonemes data. Accordingly, the controller 120 can control the user terminal device 100 to perform the functions corresponding to the recognized voice.

When a motion is input through the motion input recognizer 113, the controller 120 can control the user terminal device 100 to operate the functions corresponding to the input motion. The motion recognition can be achieved by dividing the images (e.g. sequential frames) corresponding to a user motion that is input through the motion input recognizer 113 into a hand (e.g. unfolding fingers or folding fingers to clench fist) and a background area using a motion recognition module to recognize the sequential hand motion. When a user motion is input, the controller 120 stores the input images as frame parts and using the stored frames, detects an object (e.g. a user hand) which is the target of a user motion. The controller 120 senses at least one of shape, color and motion of the object included the frames and detects the object. The controller 120 can track the motion of the detected object. Also, the controller 120 can eliminate noises other than the motion of the object. Additionally, the controller 120 decides the motion according to the shape and position of the tracked object. The controller 120 decides the change, speed, position, direction, etc. of the shape of the object and position of the tracked object to determine the motion. The user motion includes: a grab which is a motion to clench a hand; a pointing move which is a motion to move a shown cursor; a slap which is a motion to move a hand in a direction above a preset speed; a shake which is a motion to shake a hand left/right or up/down; a rotation which is a motion to rotate a hand; and a spread motion to unfold the clenched hand, etc. The technical ides of the present invention can apply to other motions other than the ones in the examples described above. In addition, the controller 120 determines whether the object moves beyond the preset area (e.g. square of 40 cm×40 cm) within the preset time (e.g. 800 ms) in order to decide whether the user motion is pointing move or slap. When the object does not move beyond the preset area within the preset time, the controller 120 can take the user motion as a point move. When the object moves beyond the preset area within the preset time, the controller 120 can take the user motion as a slap. When the speed of the object is determined to be equal to or lower than the preset speed (e.g. 30 cm/s), the controller 120 takes the user motion as a pointing move. When the speed of the object is determined to be higher than the preset speed, the controller 120 takes the user motion as a slap. Accordingly, the controller 120 can control the user terminal device 100 to perform functions corresponding to the input motion.

When a pupil motion is input through the pupil input recognizer 114, the controller 120 recognizes the pupil input using a pupil recognition module and a pupil input database. Particularly, the controller 120 can detect the center of the pupil using the image of single or both eyes of a user, which was taken by a camera, and then pick up coordinates values of the detected pupil center. Herein, the controller 120 will be able to detect the user's fixation point by using both eyes images more accurately than using single eye images. After the coordinates values of the detected pupil center are picked up, the controller 120 can map the recorded images of the forward-looking camera with the eyes of the user to be able to confirm user's fixation point, and in result being able to be aware which part of the images in the display unit 150 the user looked at. Accordingly, the controller 120 can control the user terminal device 100 to perform functions corresponding to the pupil input.

Also, when brain waves are input through the brain waves input recognizer 115, the controller 120 recognizes the brain waves using a brain waves recognition module and a brain waves database. The brain waves database maps specific brain waves data with specific control signals and stores them. Accordingly, the controller 120 compares the input brain waves to the brain waves data stored in the brain waves database to produce control signals corresponding to the input brain waves data. The brain wave input control will be described by assuming that the brain waves database maps first brain waves data with a control signal "enter" and second brain waves with a control signal "cancel". In case that the controller 120 receives first brain waves data, it can control the user terminal device 100 to perform the "enter" function.

When a control signal is input through the other device input recognizer 116, the controller 120 recognizes the control signal using another device input recognition module and the other device database. Accordingly, the controller 120 can control the user terminal device 100 using the received control signal. For example, a "route search" control signal is input from another device, the controller 120 can control the user terminal device 100 to perform the "route search" function.

As described in detail above, if the controller 120 receives a touch input, a voice input, a motion input, a pupil input, a brain waves input and a other device input, it can control the user terminal device 100 to perform a function corresponding to each input.

Additionally, the controller 120 can switch the input modes of the user terminal device based on the information about the moving state for a moving object in which the user terminal device 100 is placed and perform an operation based on the input signals by the method corresponding to the switched input mode. In other words, if the information about the moving state meets the preset conditions, the controller 120 set the input mode of the user terminal device 100 as a first input mode but if the information about the moving state does not meet the preset conditions, the controller set the input mode of the user terminal device 100 as a second input mode.

Here, the preset conditions can include at least one of the moving speed of the object, shaking of the moving object, noise in the moving object, brightness of the moving object, noise in the moving object and brightness in the moving object corresponding to accident hazards or risks.

In other words, as the moving object such as an automobile speeds up, user control gets difficult, leading to a greater risk of an accident. Also, large shaking of the moving object or loud noise in the moving object implies that the moving object may be operating on unpaved roads or be at high speed, resulting in difficult user control and a greater risk of an accident. Moreover, lower brightness in the moving object implies that the moving object may pass through a tunnel or move at night, resulting in difficult user control and subsequently greater risk of an accident. Therefore, the preset conditions can be configured in consideration of accident hazards or risks.

The preset conditions can be configured by the user of the user terminal device 100. The preset conditions can also be configured at the time of the product design by the manufacturer of the user terminal device. The storage unit 160 may store the preset conditions.

Further, an example in which the first input mode is the mode which recognizes a user touch input and a user voice input, and the second input mode is the mode which recognizes only a user voice input will be described in more detail.

In a case where the preset condition is the speed of the moving object at most 80 km/h and when the moving speed of the object in which the user terminal device 100 is placed is less than or equal to 80 km/h, the controller 120 can take a touch input and a voice input as a user input to operate the user terminal device 100, but when the moving speed of the object in which the user terminal device 100 is placed is more than 80 km/h, the controller 120 can switch the input mode of the user terminal device from the first input mode into the second input mode and take only a voice input as a user input to operate the user terminal device 100.

In other words, if a driver who drives the moving object at a high speed touches the user terminal device 100 for an operation, the driver should explore the displayed screen, leading to a decrease in focus for driving, thereby increasing the accident risk. However, if the driver driving the moving object inputs a voice command to operate the user terminal device 100, the driver can input the voice while still looking at the heading direction of the moving object, avoiding a decrease in focus while driving. Thus, if the moving speed of the object is beyond the preset speed, the controller 120 switches the input mode to the second input mode that recognizes only a voice, decreasing an accident risk of the driver.

In a case where the preset condition is the shaking of the moving object and if the shaking of the moving object is lower than or equal to the preset level, the controller 120 can take a touch input and a voice input as a user input to operate the user terminal device 100, but if the shaking of the moving object in which the user terminal device 100 is placed is greater than the preset level, the controller 120 can switch the input mode of the user terminal device 100 from the first input mode into the second input mode and take only a voice input as a user input to operate the user terminal device 100.

In addition, in case the preset condition is the noise in the moving object and if the noise in the moving object is lower than or equal to the preset level, the controller 120 can take a touch input and a voice input as a user input to operate the user terminal device 100, but if the noise in the moving object in which the user terminal device 100 is placed is greater than the preset level, the controller 120 can switch the input mode of the user terminal device 100 from the first input mode into the second input mode and take only a voice input as a user input to operate the user terminal device 100.

In addition, in case the preset condition is the brightness in the moving object and if the brightness in the moving object is lower than or equal to the preset level, the controller 120 can take a touch input and a voice input as a user input to operate the user terminal device 100, but if the brightness in the moving object in which the user terminal device 100 is placed is greater than the preset level, the controller 120 can switch the input mode of the user terminal device 100 from the first input mode into the second input mode and take only a voice input as a user input to operate the user terminal device 100.

In other words, if a driver driving the moving object touches the user terminal device 100 for an operation and the driver should explore the displayed screen, this will lead to a decrease in the focus for driving and increase risk of accidents. However, if the driver driving the moving object input a voice command to operate the user terminal device 100, the driver can input the voice while still looking at the heading direction of the moving object, maintaining the driver's focus on the driving. Thus, if the moving object runs beyond the preset speed, the controller 120 switches the input mode to the second input mode that recognizes only a voice, leading to be able to decrease the accident hazards against the driver.

Moreover, the first input mode and the second input mode are not limited in the examples described in detail above. Preferably, the first input mode may simply be any mode that includes all input methods to be able to operate the user terminal device 100, the second input mode may be a mode that allows the driver to operate the user terminal device 100 while not decreasing the driving focus of driver driving the moving object Therefore, a touch input is preferably excluded in the second input mode since it decreases the focus for driving.

A pupil input is also preferably excluded in the second input mode since pupils should face the displayed screen in order to input based on the pupils' movement and therefore cannot view the road, leading to decrease in focus while driving, thereby increasing the accident Risk.

However, the first and the second input mode are not limited to these but can change based on the user configuration.

Moreover, in describing the operation of the controller 120, the preset condition was limited to a specific limit (e.g. speed of 80 km/h), but the preset condition is not limited to this value, rather values having a preset error range (e.g. speed of 78 km/h~82 km/h) relative to the specific limit may be used.

Also, the controller 120 can control the communication unit 140 to detect external equipment which can sense the information about the moving state of a moving object. The controller 120 can control the communication unit 140 to request the information about the moving state of the moving object from the detected external equipment. For example, if the user terminal device 100 does not include one or more of the configurations included in the sensor unit 130, the user terminal device 100 may not be able to detect one or more of the information about the moving state of the moving object. In the case, the controller 120 can control the communication unit 140 to receive one or more of the undetected information about the moving state, thereby obtaining the information about the moving state of the moving object.

Additionally, the controller 120 can control to operate the only recognizer corresponding to the respective input mode. For example, the first input mode is the mode that recognizes a touch input, a voice input and a motion input as a user input, and the second input mode is the mode that recognizes only a voice input as a user input.

In the case, when the user terminal device 100 is configured as the first input mode, the controller 120 can control the recognition unit 110 not to operate (or reject input from) the pupil input recognizer 114, the brain waves input recognizer 115 and the other device input recognizer 116 but to operate only the touch input recognizer 111, the voice input recognizer 112 and the motion input recognizer 113. Also, when the user terminal device 100 is configured as the second input mode, the controller 120 can control the recognition unit 110 to operate only the voice input recognizer 112. Accordingly, the recognition unit 110 can operate only the configuration corresponding to the respective input mode to be able to control the user input to operate the user terminal device 100.

Additionally, the controller 120 controls the recognition unit 110 to operate the only configuration corresponding to the input mode, thereby being able to reduce power consumption by not operating unnecessary components.

The controller 120 can control the sensor unit 130 not to operate the configuration of the sensor unit 130 which senses unnecessary information out of the information about the moving state of the moving object. For example, the detection of the movement of the moving object is not necessary, the controller 120 can control the sensor unit 130 not to operate the movement sensor 132. The information about the moving state that is unnecessary may be the information about the moving state configured by a user or received through the communication unit 140 or information that is not needed to perform an operation of detecting the moving state according to the type of the moving object, etc. Accordingly, the controller 120 controls the sensor unit 130 to operate only the configuration corresponding to the information about the moving state needed to detect, thereby being able to reduce power consumption.

When an input mode is selected on the UI window which is intended to receive the input mode, the controller 120 can also change the input mode of the user terminal device 100 based on the determined input mode. Namely, the user may want to configure the input mode automatically according to the information about the moving state of the moving object, but manually depending on the case. Therefore, the controller 120 can configure an input mode of the user terminal device 100 as the input mode that the user set manually.

When a user input method corresponding to the an input mode is selected on the UI window which is intended to receive the input method, the controller 120 can also change the input mode of the user terminal device 100 based on the determined input method.

In addition, when a priority level is determined on the UI window which is intended to determine the priority level among the configured input methods, the controller 120 can control the user terminal device 100 to be operated based on the determined priority level.

The controller 120 can also produce a manual setting data of a user by analyzing the set input mode. The manually-configured setting data by a user comprises data corresponding to a pattern of input mode changes by the user responding to the change when the input mode of the user terminal device is switched to a second input mode from a first input mode. For example, though the controller 120 switches the input mode from a first input mode comprising a touch input and a voice input into a second input mode comprising only a touch input based on the information about the moving state of the moving object, if the user does not want the user terminal device 100 to be operated in the second input mode, the user can switch to the other input mode manually by using a motion input. The manual switching of input modes by the user in response to the controller 120 switching input modes may be called an override command of the user. The override command may be detected by a controller 12. In this case, the controller 120 can analyze the user configuration input mode to produce a pattern of manual setting data of a user. The controller 120 can also control to gather the said manual setting data of a user to save in the storage unit 160 or to update the manual setting data followed by saving in the storage unit 160.

The manual setting data of a user may be the pattern of manual input mode changes made by the user in response to the change of the input mode of the user terminal device when the device is switched to a second input mode from a first input mode. For example, when the controller 120 switches the input mode from a first input mode comprising a touch input and a voice input into a second input mode comprising only a touch input based on the information about the moving state of the moving object, if the user does not want the user terminal device 100 to be operated in the second input mode, the user can switch to the other input mode manually by providing a motion input. In this case, the controller 120 can analyze the user configuration input mode to produce manual setting data of a user. The controller 120 can also control to accumulate the said manual setting data of a user to save in the storage unit 160 or to update manual setting data and save the updated manual setting data in the storage unit 160.

The controller 120 can control switching of the first input mode into the second input mode using the accumulated manual setting data of a user. That is, when a user switches a first input mode comprising a touch input and a voice input into a second input mode comprising only a touch input and if most of the accumulated manual setting data of a user has been manually configured before as other input mode comprising only user motion inputs in the case, the controller 120 can control to switch to other input mode comprising only a user motion input.

The controller 120 can also control to switch to other input mode that used most recently when switched a first input mode into a second input mode using the updated manual setting data of a user.

Accordingly, the controller 120 takes the manual setting data of a user into consideration upon the switched input mode, leading to optimize switching of input mode based on the user behavior.

The controller 120 may include a CPU, a ROM storing a control program, a RAM memorizing input data or being used as work related memory area. The CPU, ROM, RAM may be connected via an internal bus.

Figure 3:
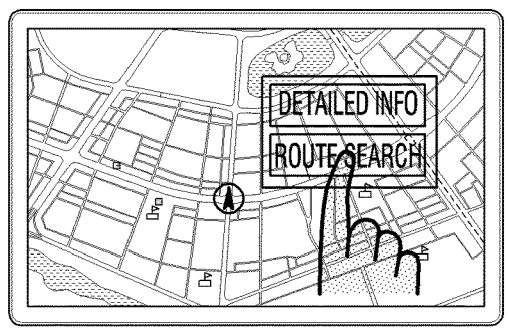
FIG. 3 to FIG. 5 illustrate a switching operation of the input mode of the user terminal device according to an exemplary embodiment.
Figure 3:
Figure 3:
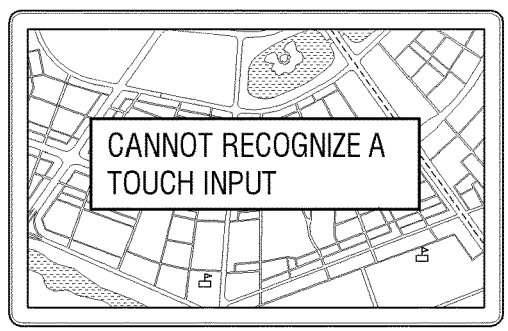
Figure 3:
Figure 3:
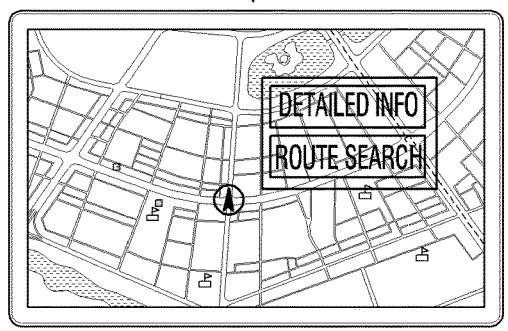
Figure 3:
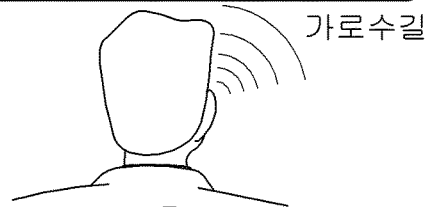
Figure 3:
Figure 3:
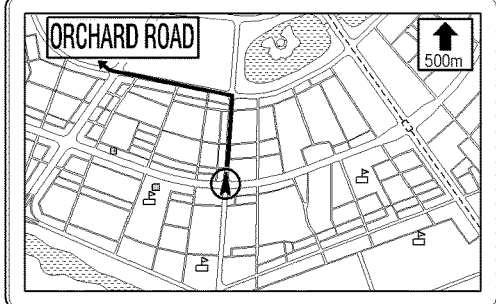
Figure 4:
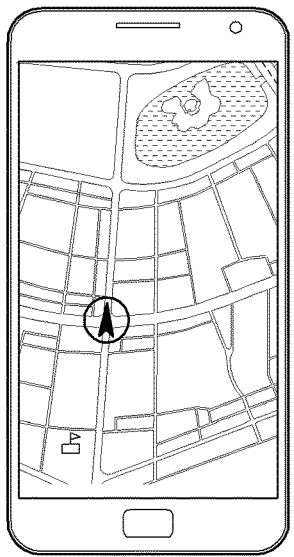
Figure 4:
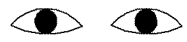
Figure 4:
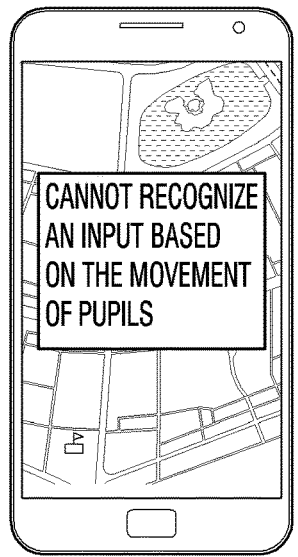
Figure 4:
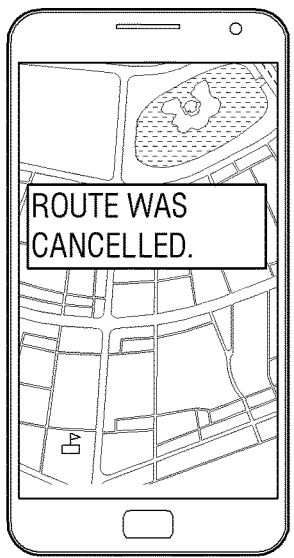
Figure 4:
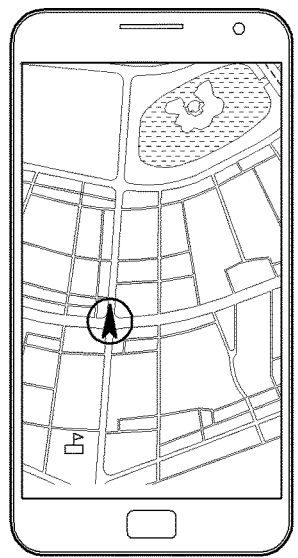
Figure 4:
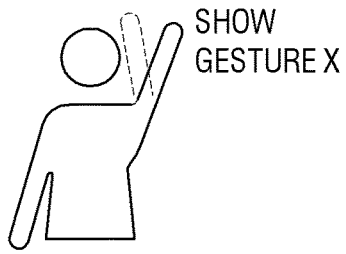
Figure 5:
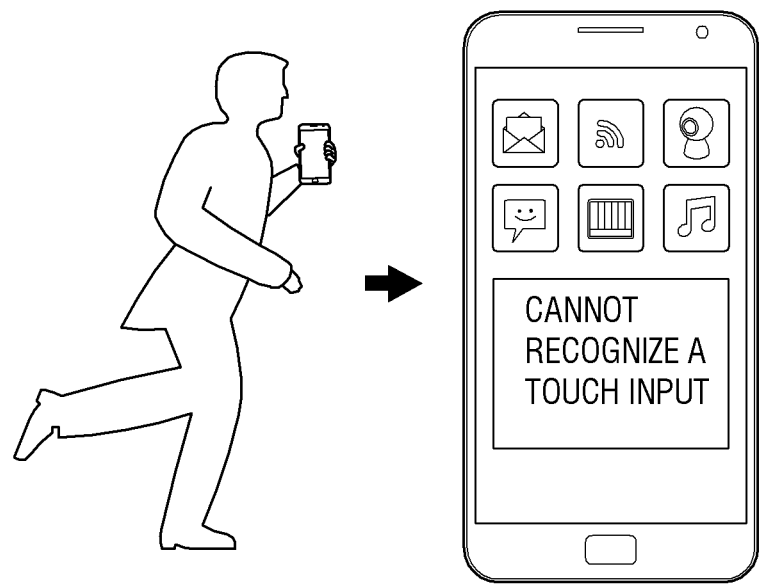
Figure 5:
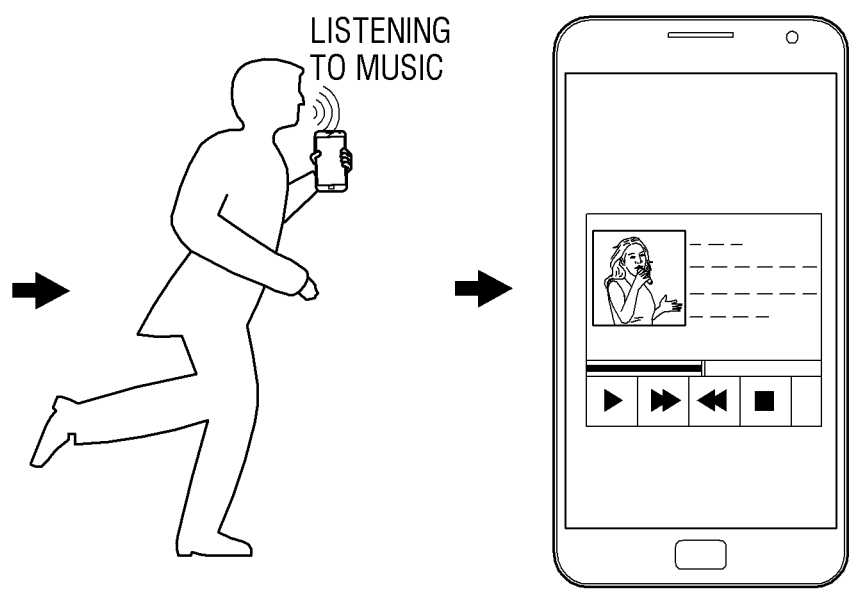

FIGS. 3 to 5 illustrate a switching operation of the input mode in the user terminal device according to an exemplary embodiment.

FIG. 3 is a diagram an example where the user terminal device is running a navigation application, the first input mode is a mode which recognizes a user touch input and a user voice input, and the second input mode is a mode which recognizes only a user voice input.

As shown in (a) of FIG. 3, as the controller 120 sets the terminal to a first input mode if the information about the moving state meets preset conditions, the recognition unit 110 recognizes a user touch input in the first input mode.

However, if the information about the moving state does not meet the preset conditions, the controller 120 switches the first input mode into the second input mode. In the case, as shown in (b) of FIG. 3, a notice such as "cannot recognize a touch input" can be provided to inform the user. Moreover, the user can be notified the touch input not being accepted using many possible methods such as sound, display, vibration, etc.

Accordingly, the user can control the operation of the user terminal device through a voice as shown in (c) of FIG. 3. That is, the user can input a street name "orchard road" through a voice command to search for the route as shown in (c) of FIG. 3.

In the case, as shown in (d) of FIG. 3, the user terminal device may search for the route and display it for the user using the input voice command.

FIG. 4 is a diagram illustrating a user terminal device is a mobile terminal device, the first input mode is a mode which recognizes an input based on the movement of a user pupil, and the second input mode is a mode which recognizes a user motion input.

As shown in (a) of FIG. 4, as the controller 120 configures a first input mode if the information about the moving state meets the preset conditions, the recognition unit 110 recognizes an input based on the movement of a user pupil.

However, if the information about the moving state does not meet the preset conditions, the controller 120 switches the first input mode into the second input mode. In the case, as shown in (b) of FIG. 4, a notice such as "cannot recognize an input based on the movement of pupils" can be provided to inform of user. Moreover, the user can be notified of the input not being recognized or accepted using the methods described above.

Accordingly, the user can control the operation of the user terminal device through a motion as shown in (c) of FIG. 4. That is, the user can input a gesture "X" to cancel the route as shown in (c) of FIG. 4. The "X" gesture is not limited to this but mapped with other function depending on the configuration. Various motions may be mapped with various other functions.

In the case, as shown in (d) of FIG. 4, the user terminal device may cancel the route guide in-progress through the input gesture.

FIG. 5 is a diagram illustrating the user terminal device that is a mobile terminal device, the first input mode is a mode which recognizes a user touch input and a user voice input, and the second input mode is a mode which recognizes only a user voice input.

As shown in (a) of FIG. 5, as the controller 120 configures a first input mode if the information about the moving state meets the preset conditions, the recognition unit 110 recognizes a user touch input.

However, if the information about the moving state does not meet the preset conditions, the controller 120 switches the first input mode into the second input mode. In the case, as shown in (b) of FIG. 5, a notice such as "Cannot recognize a touch input" can be provided to inform of user. Moreover, the user can be notified of the input not being recognized or accepted using the methods described above.

Accordingly, the user can control the operation of the user terminal device through a voice command as shown in (c) of FIG. 5. That is, the user can input "Listen to music" (a voice command corresponding to music application) through a voice command to listen to a music as shown in (c) of FIG. 5.

In the case, as shown in (d) of FIG. 5, the user terminal device may run a music application to display the music play window.

Figure 6:
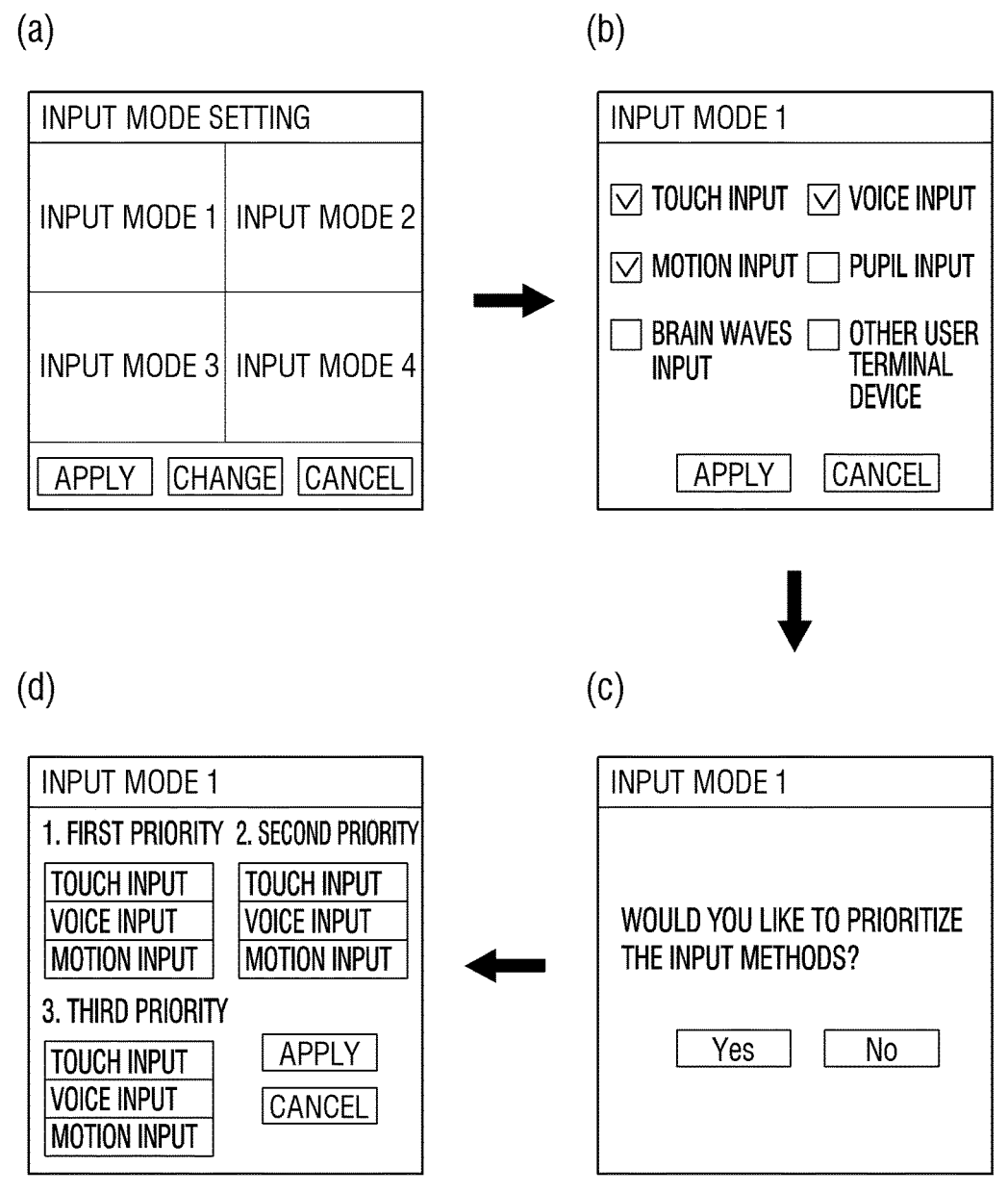

FIG. 6 illustrates an input mode setup UI according to an exemplary embodiment. As shown in FIG. 6 (a), the display unit 150 can display the input mode configuration UI window. When the user selects one of the input mode 1, input mode 2, input mode 3 and input mode 4 and presses the apply button, the controller 120 can change the input mode of the user terminal device 100 according to the selected input mode.

If the user selects the input mode 1 which is one of the input modes and presses the change button, the display unit 150 can display a UI window where a user input method included in the input mode 1 can be configured, as shown in FIG. 6 (b). Herein below, the user input method will be described assuming that the user selects 'touch input', 'voice input', 'motion input' as a user input method.

If the user configures the user input method, the display unit 150 can display a UI window to ask whether or not to prioritize the user input methods, as shown in FIG. 6 (c).

If the user selects 'YES', the display unit 150 can display a UI window to prioritize the user input methods, as shown in FIG. 6 (d). If the user selects 'touch input' for first priority, 'voice input' for second priority, 'motion input' for third priority, the controller 120 can recognize the touch input as a user input when a touch and a voice are input at the same time.

However, the input mode configuration is not limited to this, but may end without priority configuration depending on the configuration. If a priority level is not determined between the user inputs, the controller 120 can recognize and respond to all the user inputs received at the same time according to the configuration. Also, it may not recognize any user input received at the same time depending on the configuration.

Figure 7:
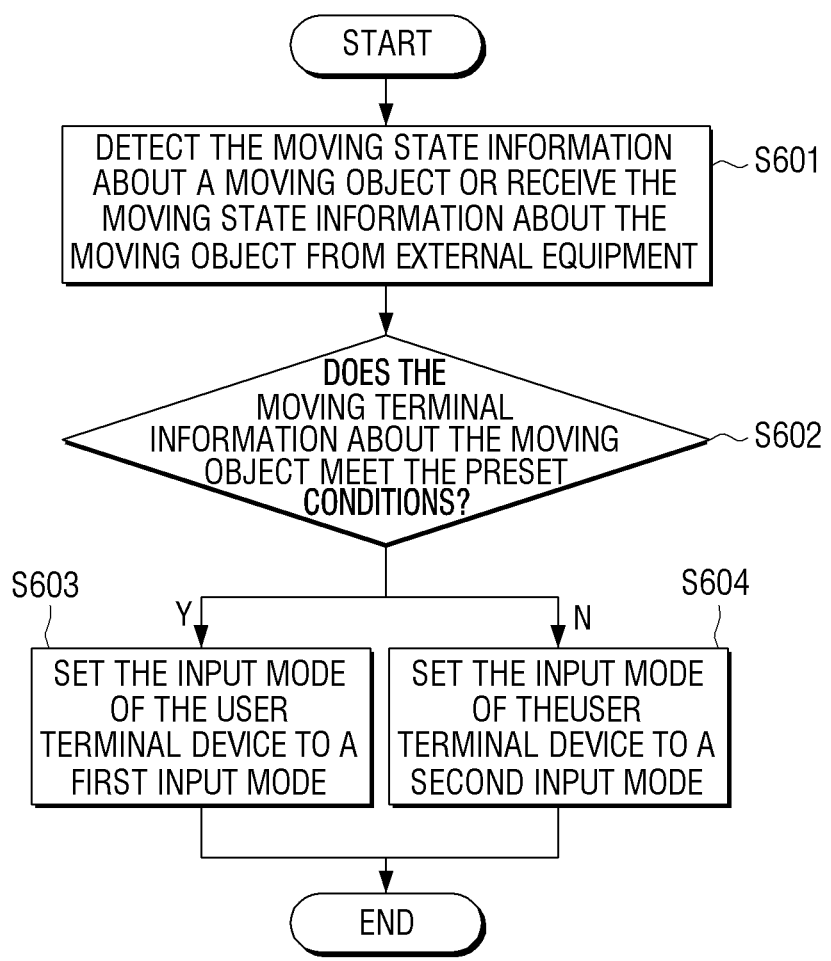
FIG. 7 is a flow chart describing a control method of the user terminal device according to an exemplary embodiment.

FIG. 7 is a flow chart describing a control method of the user terminal device according to an exemplary embodiment. Referring to FIG. 7, the control method is detects the information about the moving state of a moving object or receives the information about the moving state of the moving object from external equipment (operation 601).

The control method determines whether the information about the moving state of the moving object meets the preset conditions. If the preset conditions are met (Y in operation 602), in operation 603 the input mode of the user terminal device is set to a first input mode.

If the preset conditions (N in operation 602) are not met, in operation 604 the input mode of the user terminal device is set to a second input mode. Here, the first input mode is a mode in which the user terminal devices accepts a plurality of input modes of the user, and the second input mode is a mode in which the user terminal device accepts only a subset of the plurality of input modes available on the terminal device. For instance, the first input mode is a mode in which the user terminal device recognizes a touch input of the user and the voice input of the user as an input; and the second input mode is a mode in which the user terminal device recognizes only a voice input of the user as an input. The information about the moving state can include at least one of the speed of a moving object, movement of a moving object, noise in a moving object, and brightness in a moving object.

According to the user terminal device according to an exemplary embodiment described above, may perform switching of the input mode of the user terminal device based on the information about the moving state of a moving object in which the user terminal device is placed and can improve user convenience, accessibility and safety.

Figure 8:
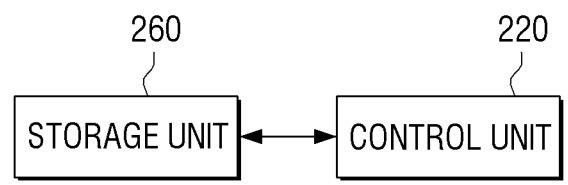
FIG. 8 is a block diagram showing a user terminal device according to an exemplary embodiment.

FIG. 8 is a block diagram showing a user terminal device according to an exemplary embodiment. Referring to FIG. 8, the user terminal device 200 according to the second embodiment of the present invention can include one or more of a storage unit 260 and a controller 220. The user terminal device 200 can be a navigation device, a mobile terminal device, a PDA or a PC, which can display the moving state of a moving object.

The storage unit 260 serves to store various programs and data needed to operate the user terminal device 200. In particular, the storage unit 260 can map the option information to be applied to the user terminal device 200 to the preset conditions, and store them. Plural pieces of information can be available. These plural pieces of information can be mapped differently and separately based on the preset conditions. For example, first option information can be mapped under a first condition, and second option information can be mapped under a second condition. The preset option information can include at least one of a UI display method, a volume and screen brightness.

The controller 220 controls the overall operation of the user terminal device 200. In particular, the controller 220 can switch the option information set in the user terminal device 200 to second option information from first option information, based on the information about the moving state of a moving object in which the user terminal device 200 is placed. The operations of the control 220 will be described below in further detail with reference to FIG. 9.

Figure 9:
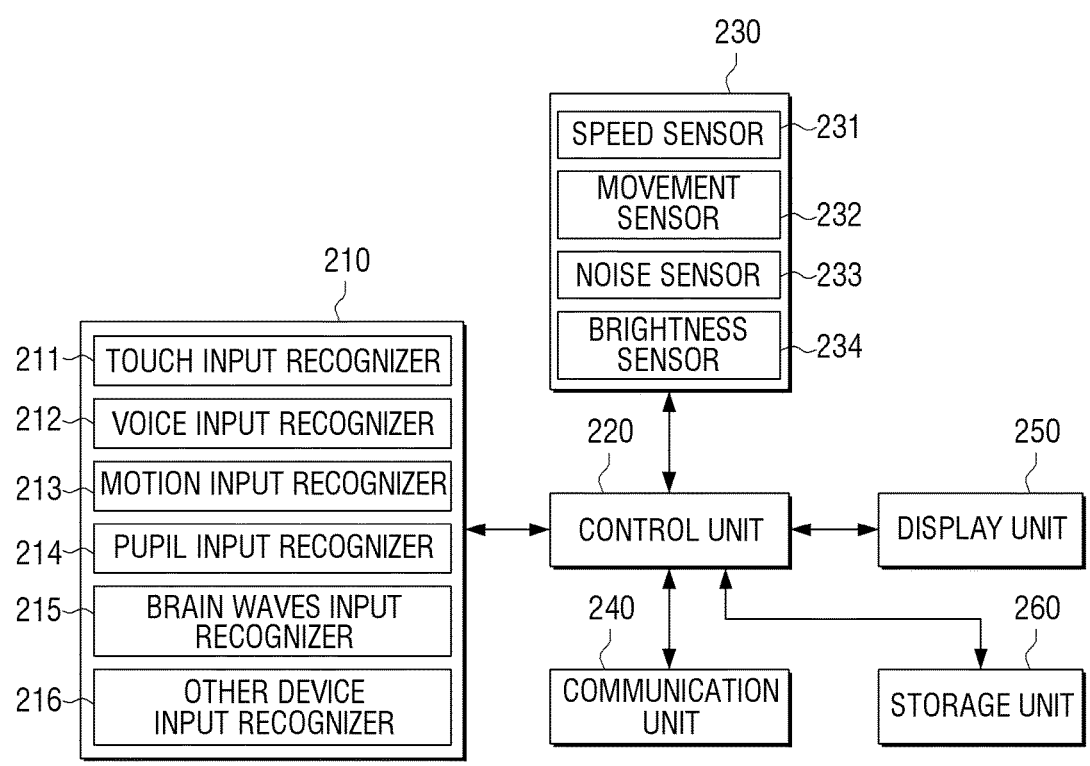
FIG. 9 is a block diagram showing the user terminal device of FIG. 8 in detail.

FIG. 9 is a block diagram showing the user terminal device in FIG. 8 in further detail. Referring to FIG. 9, the user terminal device 200 includes one or more of a recognition unit 210, a controller 220, a sensor unit 230, a communication unit 240, a display unit 250 and a storage unit 260.

The recognition unit 210 recognizes user inputs. The recognition unit 210 can include at least one of a touch input recognizer 211 that recognizes a user touch input, a voice input recognizer 212 that recognizes a user voice input, a motion input recognizer 213 that recognizes a user motion input, a pupil input recognizer 214 that recognizes an input based on the movement of a user's pupil, a brain waves input recognizer 215 that recognizes an input based on the brain waves of a user, and another device input recognizer 216 that recognizes an input from another user terminal device.

The sensor unit 230 detects information about the moving state for a moving object. The moving object can be any object that moves. For example, it can be a non-human object such as an automobile, a bus, a ship, a train or a motorcycle, or a human object such as a person. Also, the information about the moving state can include at least one of the moving speed of the object, shaking of the moving object, noise in the moving object and brightness in the moving object.

The sensor unit 230 can include at least one of a speed sensor 231 that detects the speed of the moving object, a shaking sensor 232, a noise sensor 233 and a brightness sensor 234.

The communication unit 240 connects the user terminal device 200 with external equipment. Thus, the user terminal device 200 can receive various information needed to operate the user terminal device 200, update information to update the user terminal device 200, and the like. Also, the user terminal device can receive the information about the moving state from external equipment, via the communication unit 240. The external equipment can be at least one of a speed sensor, a shaking sensor, a noise sensor and a brightness sensor. As such, when the user terminal device 200 does not have one or more of the sensor unit 230, the user terminal device 200 may get the information about the moving state of a moving object by using the received information about the moving state.

The display unit 250 displays a UI window such that the user can set or select any desired function supported by the user terminal device 200. In particular, the display unit 250 can display a UI window where the option information of the user terminal device 200 is set to either first or second option information.

The storage unit 260 serves to store various programs and data needed to operate the user control device 200. In particular, the storage unit 260 can map the preset conditions required for option switching of the user terminal device 200 to plural pieces of option information, and store them.

The controller 220 can control one or more of the recognition unit 210, the sensor unit 230, the communication 240, the display unit 250 and the storage unit 260. The controller 220 can switch the option information set in the user terminal device to second option information from first option information, based on the information about the moving state of a moving object in which the user terminal device 200 is placed or the movement of the terminal device itself. In particular, if the information about the moving state meets the preset conditions, the controller 220 sets the option information set in the user terminal device 200 to a first option information, if the information about the moving state does not meet the preset conditions, the controller 220 switches the option information set in the user terminal device 200 to a second option information from the first option information.

The preset conditions include at least one of the speed of a moving object, shaking of a moving object, noise in a moving object and brightness in a moving object, which are preset in consideration of the risk of an accident of the moving object. The preset conditions can also include at least one of the speed of a terminal device, shaking of a terminal device, noise near a terminal device and brightness near a terminal device, which are preset in consideration of the risk of an accident of the moving object.

The preset conditions can be set up by the user of the user terminal device 200. The preset conditions can also be set up by the manufacturer of the user terminal device during the production set-up process. The preset conditions can be stored in the storage unit 260.

For example, the first and second option information refer to a UI display method, and the preset condition refers to the speed of a moving object.

Suppose that the preset condition indicates the speed of a moving object being not greater than 80 km/h. If the moving object in which the user terminal device 100 is placed moves at a speed of 80 km/h or below, the controller 120 can control the display unit 250 to display a list type UI; and if the moving object in which the user terminal device 100 is placed moves at a speed above 80 km/h, the controller 120 can control the display unit 250 to display a tile type UI. Here, the list type UI may be menus that are listed in a row, and the tile type UI may be menus that are listed in plural rows, not in one row. More details on these will be provided with reference to FIG. 10 to FIG. 14.

In other words, when a driver who drives a moving object in a high speed condition uses a list type UI to manipulate the user terminal device 200, it would be difficult to select a menu while driving because the menus that are provided are small in size. In this case, the driver can be distracted from driving, which can increase the possible risk of accidents. However, if a driver who drives a moving object uses a tile type UI to manipulate the user terminal device 100, he or she can easily select a desired menu because the menus that are provided are large in size. As such, the possible risk of accidents due to the UI manipulation of the driver can be lowered. For example, the controller 220 can control the display unit 250 to display a tile type UI if the speed of a moving object exceeds the preset speed, such that the possible risk of accidents of the driver who drives a moving object can be lowered.

The controller 220 can also switch the UI display method to the tile type UI as detailed above for other preset conditions besides the speed of a moving object, including such as the one or more of a moving object, the noise in a moving object, and the brightness in a moving object. In this way, the possible risk of accidents of the driver who drives a moving object can be lowered.

According to an exemplary embodiment, the first and second option information may refer to a volume, and the preset condition refers to the noise in a moving object.

If the noise in a moving object is not greater than the preset level, the controller 220 can control the user terminal device 100 to operate at the preset volume; and if the noise in a moving object is above the preset level, the controller 220 can control the user terminal device 200 to increase the volume. However, these are only illustrative examples, and the controller 220 can control the user terminal device 200 such that the volume can be adaptively modified, depending on the noise in a moving object.

According to an exemplary embodiment, the first and second option information may refer to a brightness, and the preset condition may refer to the brightness in a moving object.

If the brightness in a moving object is not greater than the preset level, the controller 220 can control the display unit 250 to display the screen at the preset brightness; and if the brightness in a moving object is above the preset level, the controller 220 can control the display unit 250 to increase the brightness. However, these are only illustrative examples, and the controller 220 can control the display unit 250 such that the brightness can be adaptively modified, depending on the brightness in a moving object.

When illustrating the operations of the controller 220, although the preset condition has been defined to a certain threshold (e.g. 80 km/h of the speed), it should be understood that the preset condition is not limited thereto, but can include a predetermined error margin with respect to a given threshold (e.g. 78 km/h~82 km/h).

The controller 220 can control the communication unit 240 to search for external equipment that can detect the information on the moving state of a moving object. Further, the controller 220 can control the communication unit 240 to request the external equipment to provide the information about the moving state of a moving object and to receive the information therefrom.

The controller 220 can control the sensor unit 230 in a manner that a certain configuration of the sensor unit 230, which detects the information about an idle state of a moving object where the detection of the sensor unit is not necessary.

When the option information is set in the UI window where the option information is supposed to be set, the controller 220 can set the existing option information of the user terminal device according to the set option information. In other words, some users might want the option information of the user terminal device 200 to be set automatically according to the information about the moving state of a moving object, but some users might want to set the option information manually. As such, the controller 220 can set the existing option information of the user terminal device 200 to the manually-set option information by a user.

The controller 220 can produce a manual setting data of a user by analyzing the set option information. Here, the manual setting data of a user corresponds to an option information change pattern of a user, when the option information in the user terminal device has been switched to second option information from first option information. For instance, when a user does not want to operate the user terminal device 200 with a tile type UI after the controller 220 switched the list type UI to the tile type UI based on the information about the moving state of a moving object, the user can manually switch the UI to the list type UI. In this case, the controller 220 can produce a manual setting data of a user by analyzing the option information set by the user. Moreover, the controller 220 can control in such a way that the manual setting data of a user is accumulated or updated in the storage unit 260 where the data is to be stored.

Figure 10:
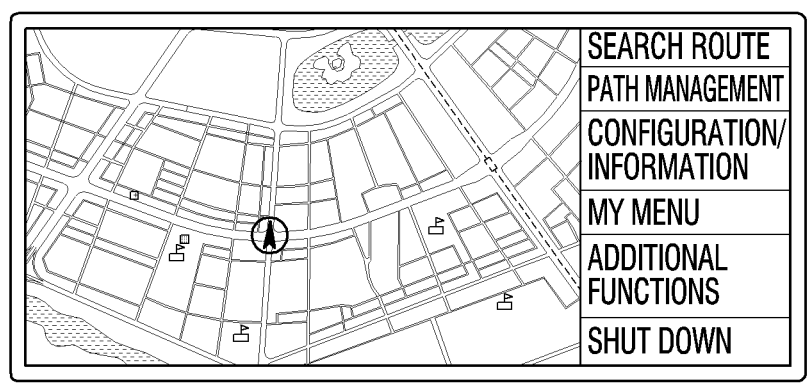
FIG. 10 to FIG. 14 illustrate a switching operation of the option information of the user terminal device according to an exemplary embodiment.
Figure 10:
Figure 10:
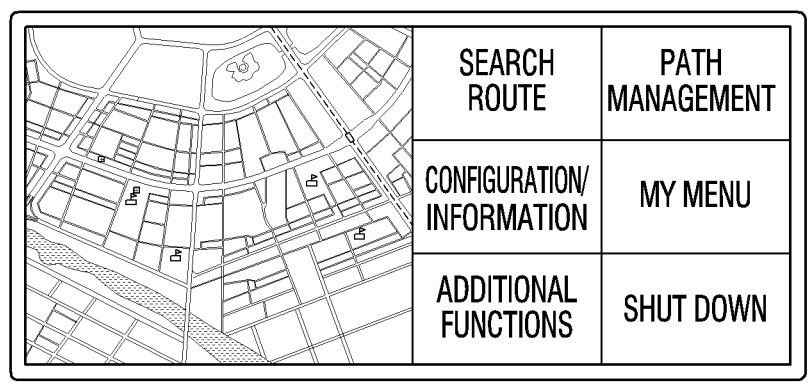
Figure 11:
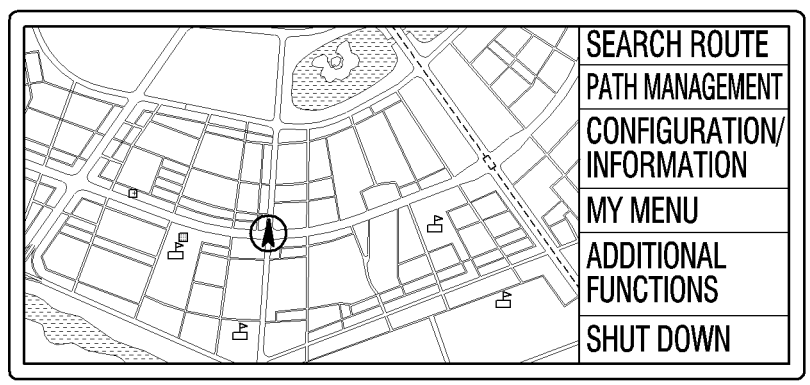
Figure 11:
Figure 11:
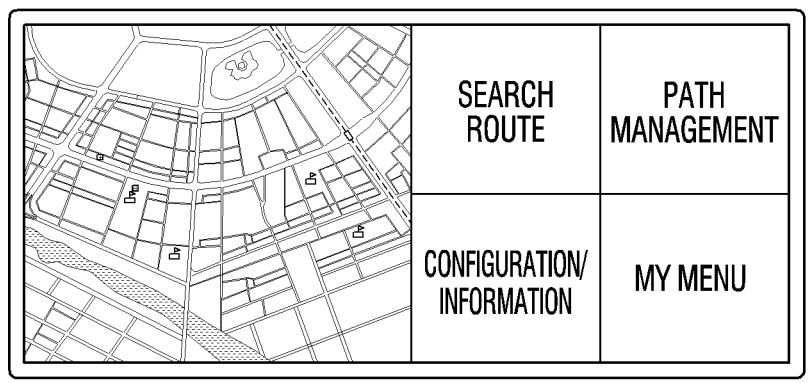

In FIG. 10 and FIG. 11, it is assumed, for illustration, that the user terminal device corresponds to a navigation device, and the option information corresponds to a UI display method.

As shown in FIG. 10 (a), the controller 220 sets the information about the moving state to first option information if the former meets the preset conditions. As such, the display unit 250 display a list type UI.

However, if the information about the moving state does not meet the preset conditions, the controller 220 switches the first option information to second option information. In this case, the display unit 250 can display a tile type UI, as shown in FIG. 10 (b) In this case, the controller 220 can control the display unit 250 to display a map image on a reduced scale. Depending on the case, as shown in FIG. 11 (b), the controller 220 can control the display unit 250 to display a tile type UI, after reducing the number of menus shown on the list type UI. Those menus shown on the tile type UI can be composed of user's favorite menus.

Figure 12:
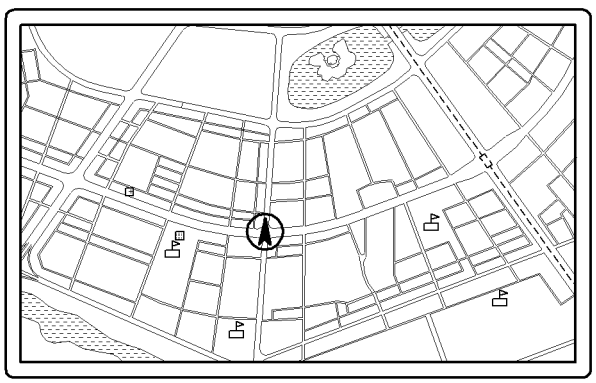
Figure 12:
Figure 12:
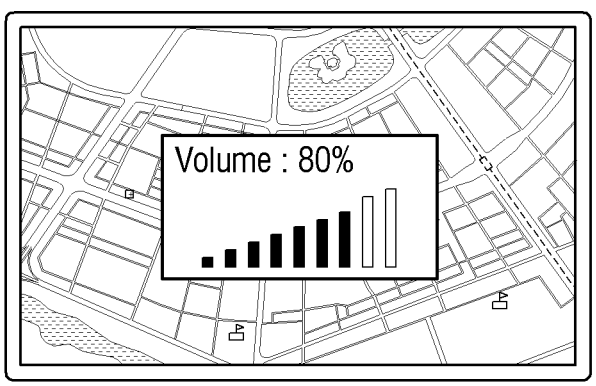

In FIG. 12, it is assumed, for illustration, that the user terminal device corresponds to a navigation device, and the option information corresponds to a volume.

As shown in FIG. 12 (a), when the information about the moving state meets the preset conditions, the controller 220 can set the information to first option information and provide a first volume.

However, when the information about the moving state does not meet the preset conditions, the controller 220 switches the first option information to second option information. In this case, as shown in FIG. 12 (b), the controller 220 can automatically switches the volume to a second volume, and provide voice of a second volume. In this case, the switched second volume can be indicated on the display unit 250.

Figure 13:
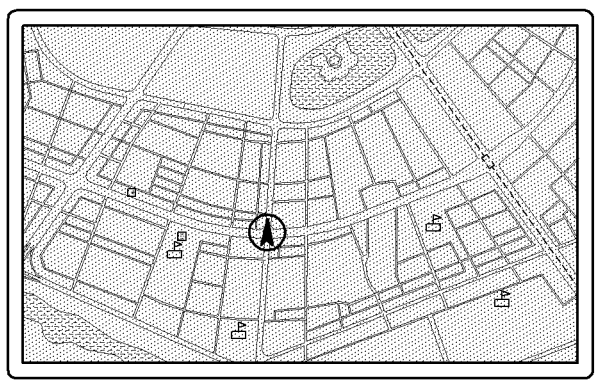
Figure 13:
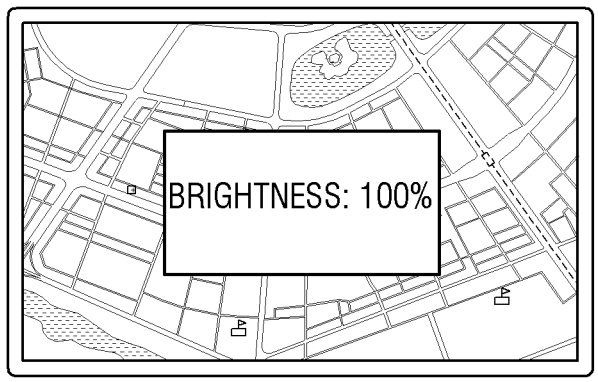

In FIG. 13, it is assumed, for illustration, that the user terminal device corresponds to a navigation device, and the option information corresponds to a brightness.

As shown in FIG. 13 (a), when the information about the moving state meets the preset conditions, the controller 220 can set the information to first option information, and provide an image of a first brightness.

However, if the information about the moving state does not meet the preset conditions, the controller (220) switches the first option information to second option information. In this case, as shown in FIG. 13 (b), the controller 220 can automatically switch the brightness to a second brightness, and provide an image of the second brightness level. In this case, a brightness level corresponding to the switched brightness level can be indicated on the display unit 250 (e.g. information on a displayed image, such as '100% brightness').

Figure 14:
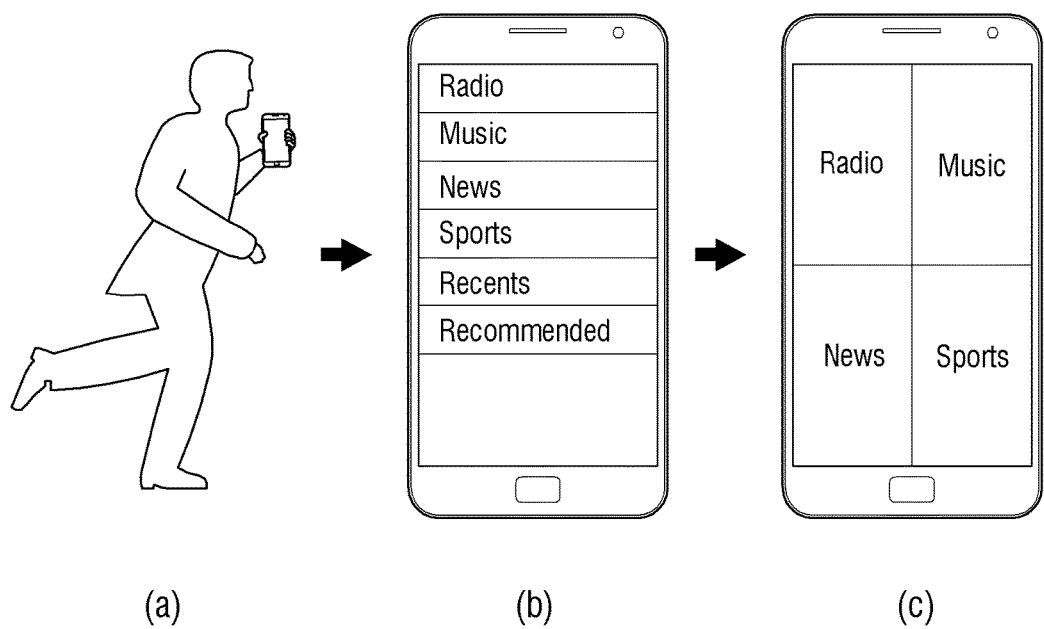
Figure 15:
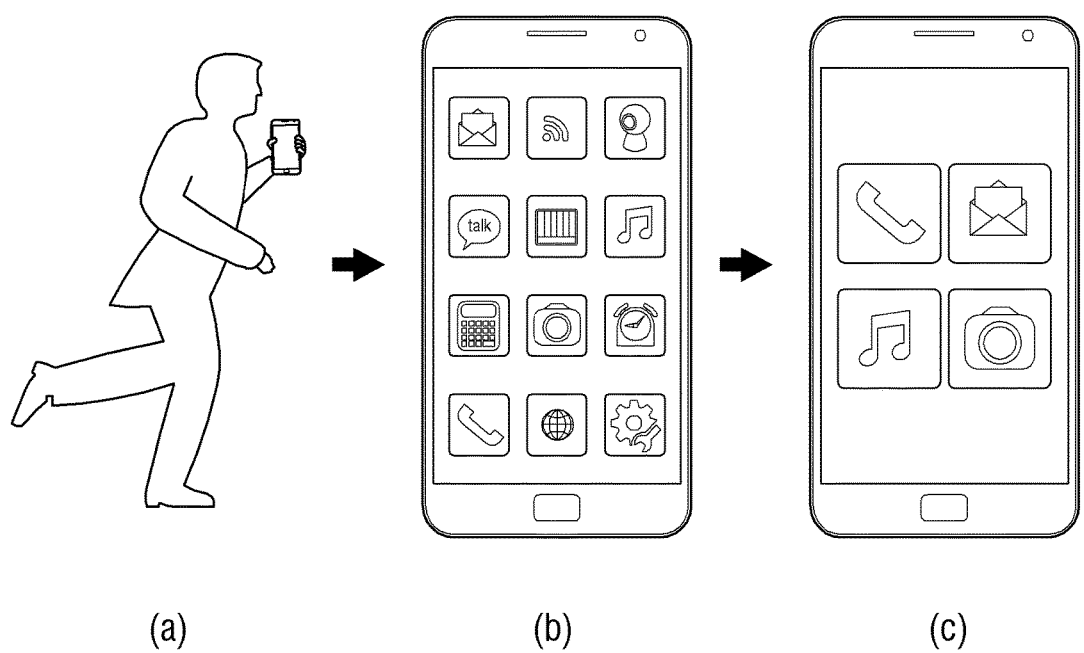
FIG. 15 is a flow chart describing a control method of the user terminal device according to an exemplary embodiment.

In examples shown in FIGS. 14 and 15, the user terminal device corresponds to a navigation device, and the option information corresponds to a UI display method.

As shown in FIG. 14 (a), when the information about the moving state of a user who is running at the moment meets the preset conditions, the controller 220 sets the information to a first option information, and the display unit 250 displays a list type UI as shown in FIG. 14 (b).

However, when the information about the moving state of a user does not meet the preset conditions, the controller 220 switches the first option information to second option information. In this case, the display unit 250 can display a tile type UI as shown in FIG. 14 (c).

Depending on the case, when an application icon is displayed as shown in FIG. 15 (b) and the information about the moving state of a user does not meet the preset conditions, the controller 220 switches the first option information to a second option information. In this case, the display unit 250 can display a user's most favorite application icon among other application icons in an enlarged size, as shown in FIG. 15 (c). For instance, the display unit 250 can display a 'phone application icon', 'message application icon', 'music application icon', 'picture application icon' or the like. Accordingly, the user can easily choose a desired application icon from the most commonly used application icons while exercising.

Figure 16:
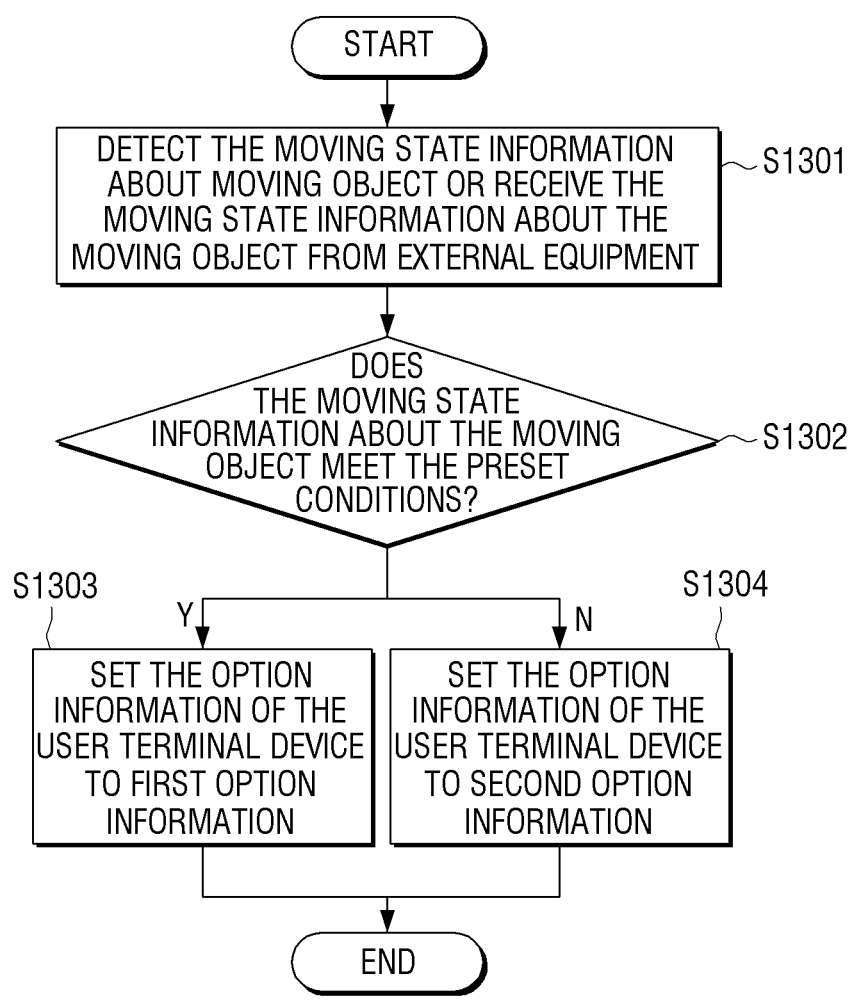
FIG. 16 is a block diagram showing a user terminal device according to an exemplary embodiment.

FIG. 16 is a flow chart describing a control method of the user terminal device according to an exemplary embodiment. Referring to FIG. 16, according to the control method, in operation 1301 the information about the moving state of a moving object is detected or received from external equipment.

In operation 1302, it is determined whether the information about the moving state of a moving object meets the preset conditions. If the preset conditions are met (Y in operation 1302), in operation 1303 the option information in the user terminal device is set to a first option information. If the preset conditions are not met (N in operation 1302), in operation 1304 the option information in the user terminal device is set to a second option information.

Here, the first option information can be a list type UI, and the second option information can be a tile type UI. Also, the first option information can be a low volume, and the second option information can be a high volume. Moreover, the first option can be a low brightness screen, and the second option information can be a high brightness screen.

According to the user terminal device described above, the user terminal device can switch the option information set in the user terminal device, based on the information about the moving state of a moving object, such that the user convenience can be improved.

Figure 17:
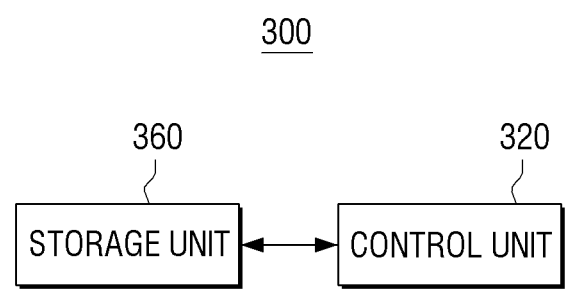
FIG. 17 is a block diagram showing the user terminal device of FIG. 16 in detail.

FIG. 17 is a block diagram showing a user terminal device according to an exemplary embodiment. Referring to FIG. 17, the user terminal device 300 includes one or more of a storage unit 360, and a controller 320. The user terminal device 300 can be a navigation device, a mobile terminal device, a PDA, a PC or the like.

The storage unit 360 serves to store various programs and data needed to operate the user terminal device 300. In particular, the storage unit 360 can map user interface modes to the user profile information of a user who operates the user terminal device 300 and store them. A plurality of user interface modes can be available. Also, these user interface modes can be mapped differently and separately based on the user profile information of a user who operates the user terminal device. For example, a first user interface mode can be mapped to a first user, and a second user interface mode can be mapped to a second user.

The user profile information refers to information for identifying users, including user account information such as ID/password, identification information of external equipment (e.g. MAC address information) cooperating with the user terminal device 300 or the like.

The controller 320 controls the overall operation of the user terminal device 300. In particular, the controller 320 can switch the user interface mode set in the user terminal device 300 to a second user interface mode from a first user interface mode, based on the user profile information of a user who operates the user terminal device 300. The operations of the control 320 will be described below in further detail with reference to FIG. 15.

Figure 18:
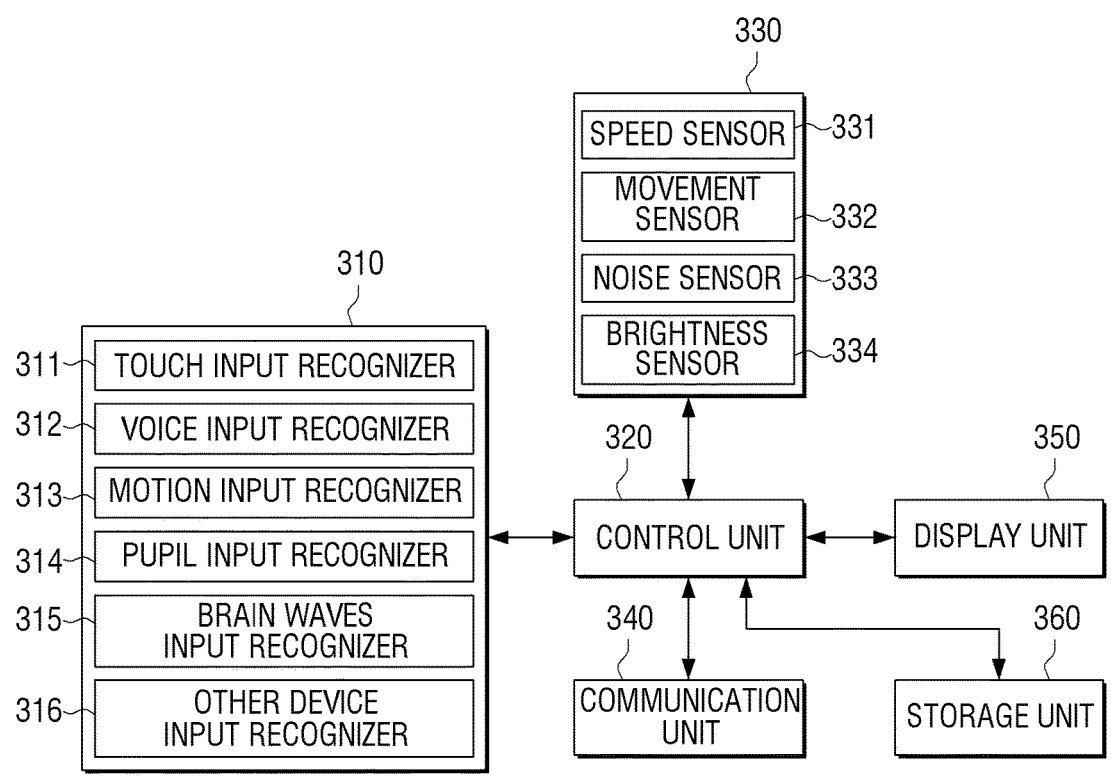
FIG. 18 to FIG. 21 illustrate a switching operation of the user interface mode in the user terminal device according to an exemplary embodiment.

FIG. 18 is a block diagram showing the user terminal device of FIG. 17 in detail. Referring to FIG. 18, the user terminal device 300 includes one or more of a recognition unit 310, a controller 320, a sensor unit 330, a communication unit 340, a display unit 350, and a storage unit 360.

The communication unit 340 connects the user terminal device 300 with external equipment. In particular, the user terminal device can receive the user profile information from external equipment, via the communication unit 340. The communication unit 340 can receive the user profile information from external equipment, using Wi-Fi, Bluetooth, RFID, NFC etc. Here, the external equipment can be a mobile terminal device, a PDA, a PC or the like.

In the case of RFID or NFC, the communication unit can receive the user profile information through tagging between the user terminal device and the external equipment. More specifically, in case of RFID or NFC, the user terminal device has an RFID or NFC reader, and the external equipment has an RFID or NFC tag. As such, when the external equipment moves towards the user terminal device 300 and tagging is performed, the RFID or NFC reader available in the user terminal device 300 reads the information on the RFID or NFC tag available in the external equipment.

The term 'tagging' herein corresponds to an action that at least one of the user terminal device and external equipment moves into a coverage area where short distance wireless communication is enabled. As it gets closer to such an area, the RFID or NFC reader in the user terminal device 300 can read the information recorded on the RFID or NFC tag in the external equipment. For the short distance wireless communication, NFC (Near Field Communication) for example can be used. NFC is a non-contact type short distance wireless communication method. With the NFC technology, transmitting and receiving data to and from a plurality of terminals within a short distance such as about 10 cm can be made it possible. When tagging is done, the RFID or NFC reader in the user terminal device 300 reads the user profile information from the RFID or NFC tag in the external equipment.

The display unit 350 displays a UI window so that a user can set or select any desired function supported by the user terminal device 300. In particular, the display unit 350 can display a UI window for taking an input of the user profile information. The UI window may be one for accepting an input of the user account information is input. As such, the user can input the user profile information by inputting the user account information.

The user profile information can be received by communicating with the external equipment, or can be input by the user.

The storage unit 360 serves to store various programs and data needed to operate the user terminal device 300. In particular, the storage unit 360 can map the user interface modes to the user profile information of a user who operates the user terminal device 300.

The controller 320 can control one or more of the recognition unit 310, the sensor unit 330, the communication unit 340, the display unit 350 and the storage unit 360.

In particular, the controller 320 can switch the user interface mode set in the user terminal device to a second user interface mode from a first user interface mode, based on the user profile information of a user who operates the user terminal device 300.

The controller 320 can switch the user interface mode set in the user terminal device 300 to a second user interface mode from a first user interface mode, based on at least one of the user profile information input through the UI window for taking an input of the user profile information as well as the user profile information received through the communication unit 340.

The user interface mode can include at least one of the input modes of the user terminal device, the UI modes of the user terminal device, and the option modes of the user terminal device.

Since people who use the user terminal device 300 may have a different preference, their preferred user interface modes may differ. For instance, if the user interface mode is an input mode, a person who tends to drive safely and is not easily distracted might prefer using all of those inputs available and controllable by the user terminal device 300 (e.g. touch input, voice input, motion input, user's pupil input, brain waves input, input from other user terminal device) as an input mode. On the other hand, a person who has had an accident, is easily distracted, or tends to drive in an unsafe manner might prefer to use only some of the input modes controllable by the user terminal device 300, such as voice input, motion input, brain waves input, and input from other user terminal device as an input mode, which are not as distracting.

When the user interface which configures a background, older people might prefer a UI with bigger letters, a larger image and a simpler UI configuration. On the other hand, young people might prefer a UI with colorful graphics or a UI with a celebrity background image.

When the user interface mode is an option mode, older people might prefer an option mode with a bright screen and high volume. People who like listening to loud music might prefer an option mode with high volume.

Accordingly, the controller 320 can switch the user interface mode set in the user terminal device to a second user interface mode from a first user interface mode, based on the user profile information.

The controller 320 can set the user interface mode of the user terminal device 300 to another user interface mode that is set through the UI window where the user interface mode is supposed to be set. In other words, the user might want the user interface mode to be set automatically based on the user profile information, but the user might want to set the user interface mode manually, depending on the case. Accordingly, the controller 320 can set the user interface mode of the user terminal device 300 to a user interface mode that is set manually by the user.

The controller 320 can produce a user's manual setting data to correspond to the user profile information, by analyzing the user interface mode set by the user. The user's manual setting data may include information corresponding to a user interface mode change pattern that responds to switching of the user interface mode of the user terminal device to a second input mode from a first input mode. For instance, if the user does not want the user terminal device to operate in the second user interface mode after the controller 320 has switched the user interface mode based on the user profile information of a user who operates the user terminal device 300 to a second user interface mode from a first user interface mode, the user can manually switch the user interface mode to another user interface mode. In this case, the controller 320 can produce a user's manual setting data, by analyzing the user interface mode set by the user. The controller 320 can also accumulate said user's manual setting data in the storage unit 360, or update the data before storing in the storage unit 360.

The controller 320 can control switching the user interface mode from the first user interface mode to the second user interface mode, using the accumulated user's manual setting data. For example, when the user interface mode has been switched from the first user interface mode to the second user interface mode and if the data the user has manually set in another user interface mode corresponds to most of the accumulated user's manual setting data, the controller 320 can switch the existing user interface mode to another user interface corresponding to the accumulated user's manual setting data.

When the user interface mode has been switched from the first user interface mode to the second user interface mode, the controller 320 utilizes the updated user's manual setting data to switch the existing user interface mode to the most recently updated user interface mode.

In this manner, the controller 320 reflects the user's manual setting data at the time of switching the user interface mode, such that the user interface mode switching operation can be optimized based on the user's action.

The controller 320 can produce a user's preferred action data corresponding to the user profile information, and generate a user interface mode corresponding to the user profile information by using the user's preferred action pattern data. The user's preferred action data refers to any function that is frequently used by a user when using the user terminal device 300. For instance, it indicates a user's preferred action pattern, using a touch mode for the input mode, using a tile mode UI for the UI mode, setting the volume to 50%, etc. In other words, the controller 320 can produce preferred action data from the user's preferred action pattern described above, and generate a user interface mode corresponding to the user profile information by using the preferred action data. Further, the controller 320 can control the storage unit 360 to store said user's preferred action data.

The controller 320 can set the user interface mode for the user terminal device 300 to another user interface mode that is set by using the user's preferred action data. In this way, the user can use the user terminal device 300 in his or her favorite user interface mode, through an input of the user profile information or an input of the user profile information from external equipment.

Figure 19:
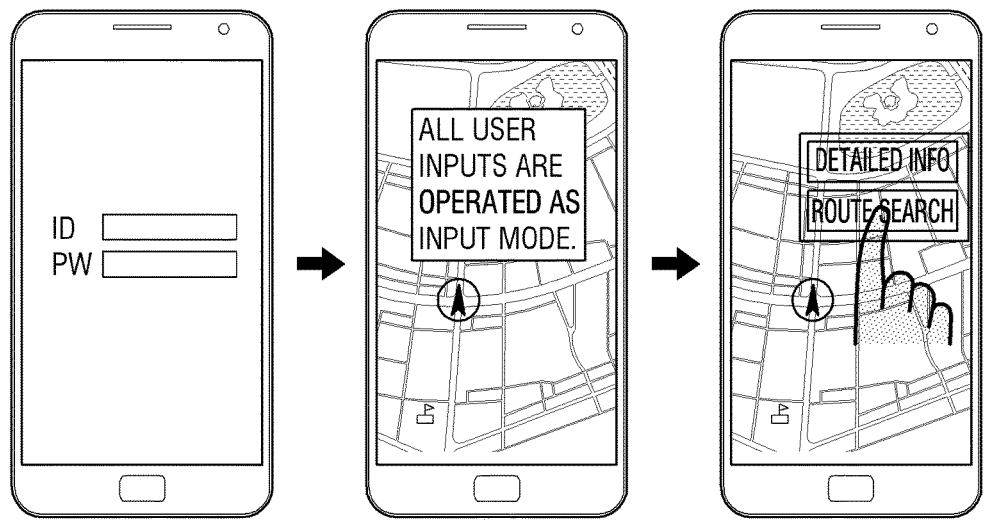
Figure 19:
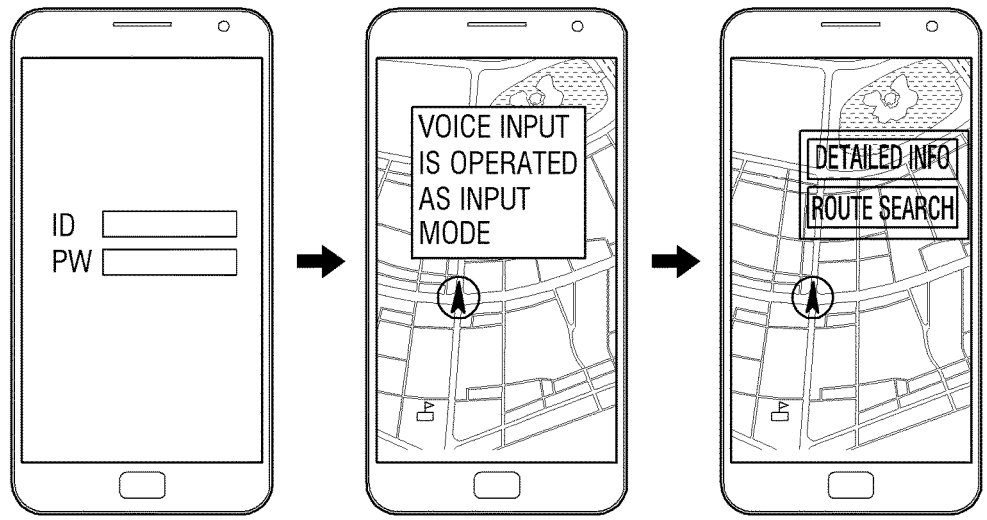

FIG. 19 illustrates switching of an input mode among user interface modes, based on the user profile information.

As shown in FIGS. 19 (*a*) and (*d*), the display unit 350 can display a UI window for taking an input of the user account information. This allows a user to input the user profile information.

In this case, the controller 320 can set the user interface mode for the user terminal device 300, based on the user profile information.

For instance, the controller 320 can set the user interface mode such that every user input is operated as an input mode as shown in FIG. 19 (*b*); or the controller 320 can set the user interface mode such that only a voice input is operated as an input mode as shown in FIG. 19 (*e*).

In this case, a user who has input the account information illustrated in FIG. 19 (*a*) can control the user terminal device 300 through a touch input among all those user's inputs, as shown in FIG. 19 (*c*). A user who has input the account information illustrated in FIG. 19 (*d*) can control the user terminal device 300 only through a voice input.

For instance, a person who tends to drive safely might prefer using all of those inputs available and controllable by the user terminal device 300 (e.g. touch input, voice input, motion input, user's pupil input, brain waves input, input from other user terminal device) as an input mode. On the other hand, a person who has had an accident, tends to drive in an unsafe manner, or is easily distracted might prefer to use only certain input modes controllable by the user terminal device 300, such as voice input, motion input, brain waves input, and input from other user terminal device as an input mode. As such, as in FIG. 19, the controller 320 can set the user interface mode, based on the user profile information.

It should be noted that FIG. 19 is for illustrative purposes only and does not limit the exemplary embodiments. For example, a UI window for taking an input of the user account information can vary, depending on a password input method.

Figure 20:
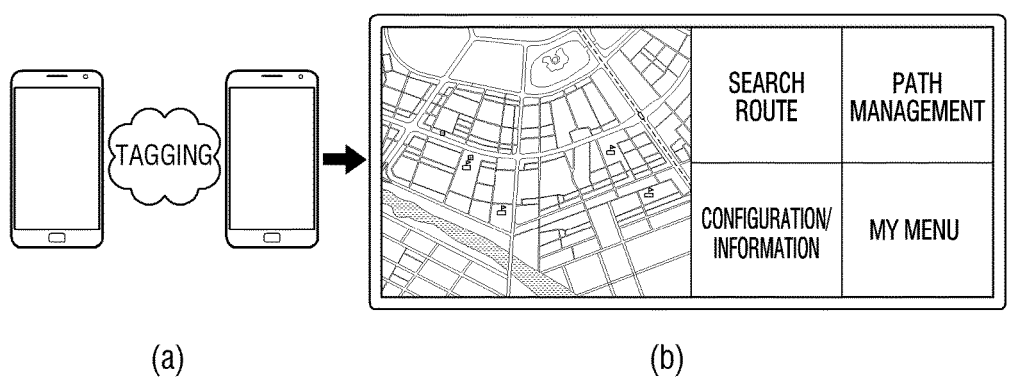
Figure 20:
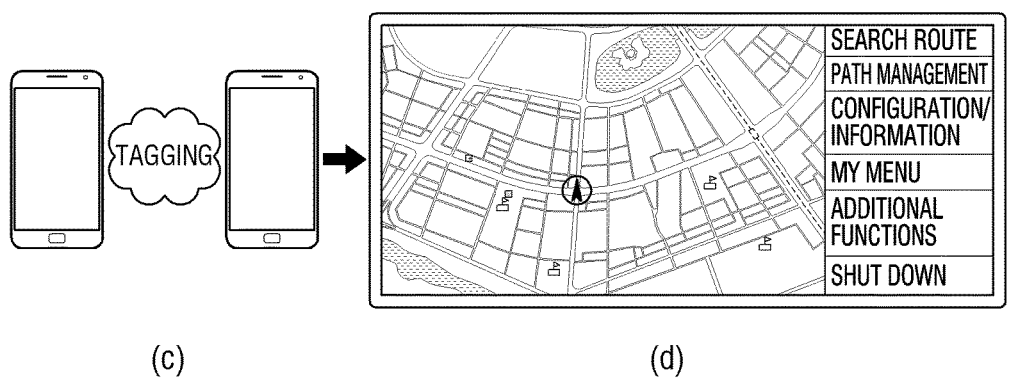

FIG. 20 illustrates a case where the UI mode among other user interface modes is changed, based on the user profile information.

The user profile information can be input to the user terminal device 300 by tagging, as shown in FIGS. 20 (*a*) and (*d*).

In this case, the controller 320 can set the user interface mode for the user terminal device 300, based on the user profile information.

For example, as shown in FIG. 20 (*b*), a tile type UI can be displayed, and letters of a smaller font size can be applied. Also, as shown in FIG. 20 (*d*), a list type UI can be displayed, and letters of a larger font size can be applied.

In other words, older people might prefer a UI with bigger letters, a larger image and a simpler UI configuration, as shown in FIG. 20 (*b*). On the other hand, young people might prefer a UI with a lot of content on one screen. As such, the controller can set the user interface mode for the user terminal device 300, based on the user profile information.

Figure 21:
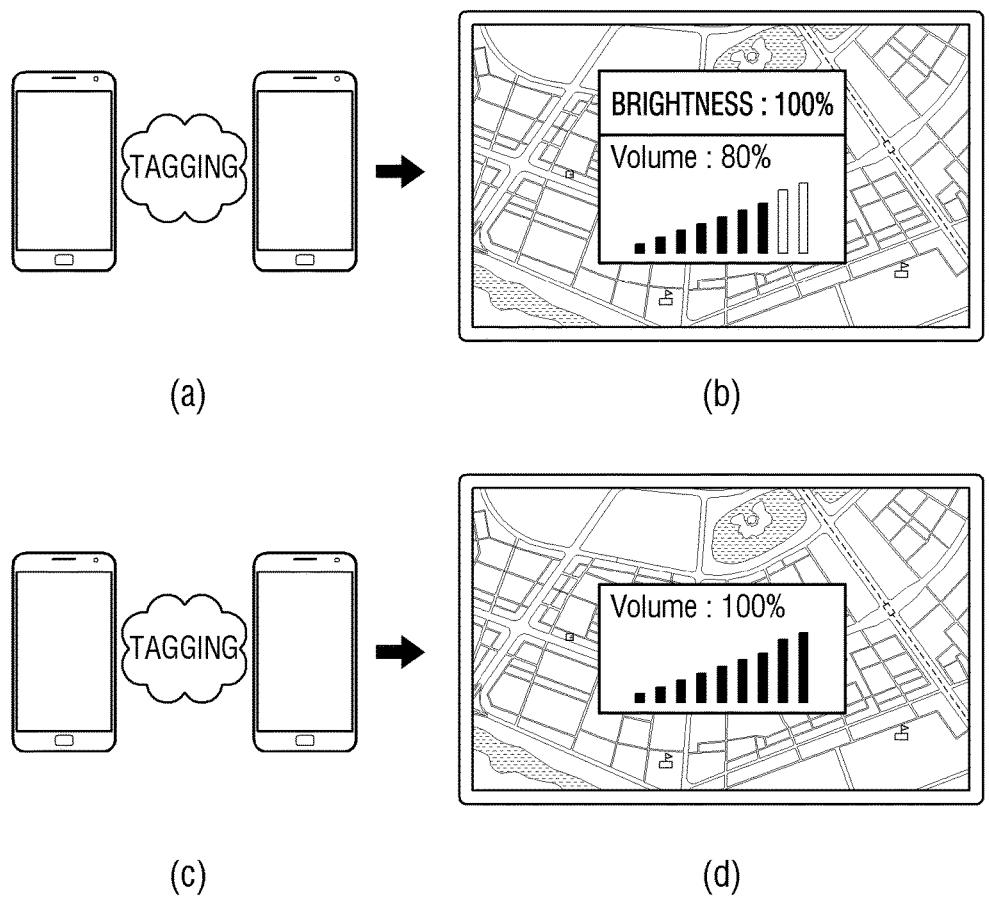

FIG. 21 illustrates a case where the option mode among other user interface modes is changed, based on the user profile information.

The user profile information can be input to the user terminal device 300 by tagging, as shown in FIGS. 21 (*a*) and (*d*).

In this case, the controller 320 can set the user interface mode for the user terminal device 300, based on the user profile information For example, as shown in FIG. 21 (*b*), it is possible to set the brightness to 100%, and set the volume to 80% in the option mode. Also, as shown in FIG. 21 (*d*), it is possible to set the volume to 100%. In other words, older people might prefer an option mode with a bright screen and louder volume. Moreover, people who like listening to music might prefer an option mode with high volume. Accordingly, the controller 320 can set the user interface mode for the user terminal device 300, based on the user profile information.

It should be noted that FIG. 19 to FIG. 21 are for illustrative purposes only and do not limit the exemplary embodiments. For example, a UI window for taking an input of the user account information can vary, depending on a password input method. Also, the user interface modes can be overlapped. For example, based on the user profile information, one or more of the input mode, the UI mode and the option mode can be set.

Figure 22:
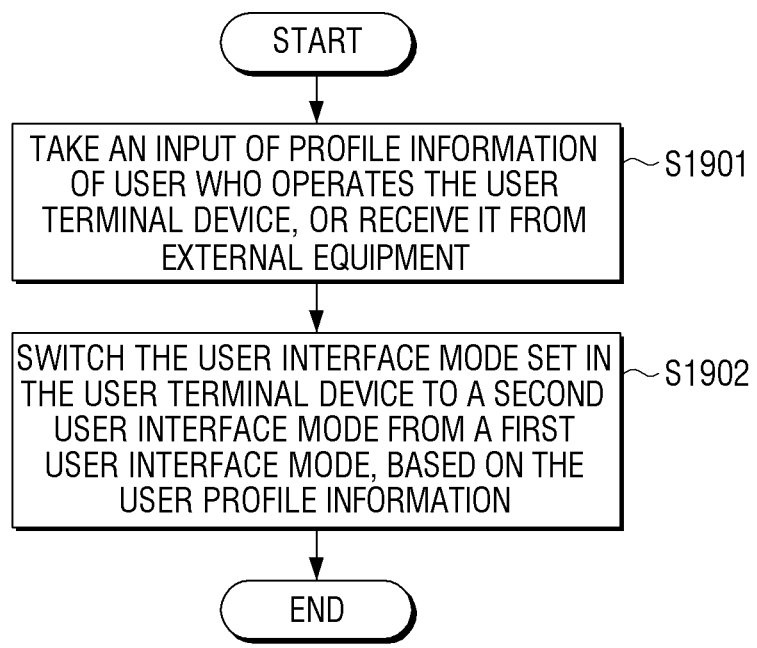
FIG. 22 is a flow chart describing a control method of the user terminal device according to an exemplary embodiment.

FIG. 22 is a flow chart describing a control method of the user terminal device according to an exemplary embodiment. Referring to FIG. 22, first, in operation 1901, the user profile information of a user who operates the user terminal device is input through the display unit or from external equipment.

In operation 1902, the user interface mode set in the user terminal device is switched to a second user interface mode from a first user interface mode, based on the user profile information.

The user interface mode can include at least one of an input mode of the user terminal device, a UI mode of the user terminal device, and an option mode of the user terminal device.

According to the user terminal device of described above, user convenience can be improved by switching the user interface mode set in the user terminal device, based on the user profile information of a user who operates the user terminal device.

Figure 23:
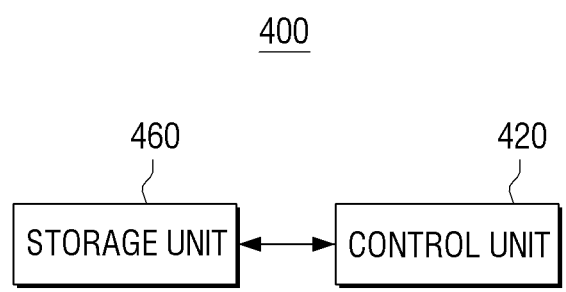
FIG. 23 is a block diagram showing a user terminal device according to an exemplary embodiment.

FIG. 23 is a block diagram showing a user terminal device according to an exemplary embodiment. Referring to FIG. 22, the user terminal device 400 can include one or more of a storage unit 460 and a controller 420. The user terminal device 400 can be a navigation device, a mobile terminal device, a PDA or a PC.

The storage unit 460 serves to store various programs and data needed to operate the user terminal device 400. In particular, the storage unit 460 can map graphical user interface (GUI) information (e.g., an icon, a button, an image, graphical information, etc.) to a moving object's state information and environment information of a moving object. The GUI information may be referred to as a GUI element. Plural pieces of GUI information can be mapped. These plural pieces of GUI information can be mapped differently and separately based on the moving object's state and environment information of a moving object.

The moving object's state information can be, for example, a fuel level of the moving object, a current location of the moving object, a destination of the moving object, a travel distance of the moving object and the like. The moving object's environment information can be, for example, a current weather condition, current time and the like.

The controller 420 controls the overall operation of the user terminal device 400. In particular, the controller 420 can switch the GUI information set in the user terminal device 400 to second GUI information from first GUI information, based on at least one of the state information of a moving object and the environment information of a moving object. The operation of the controller 420 will be described blow in further detail with reference to FIG. 24.

Figure 24:
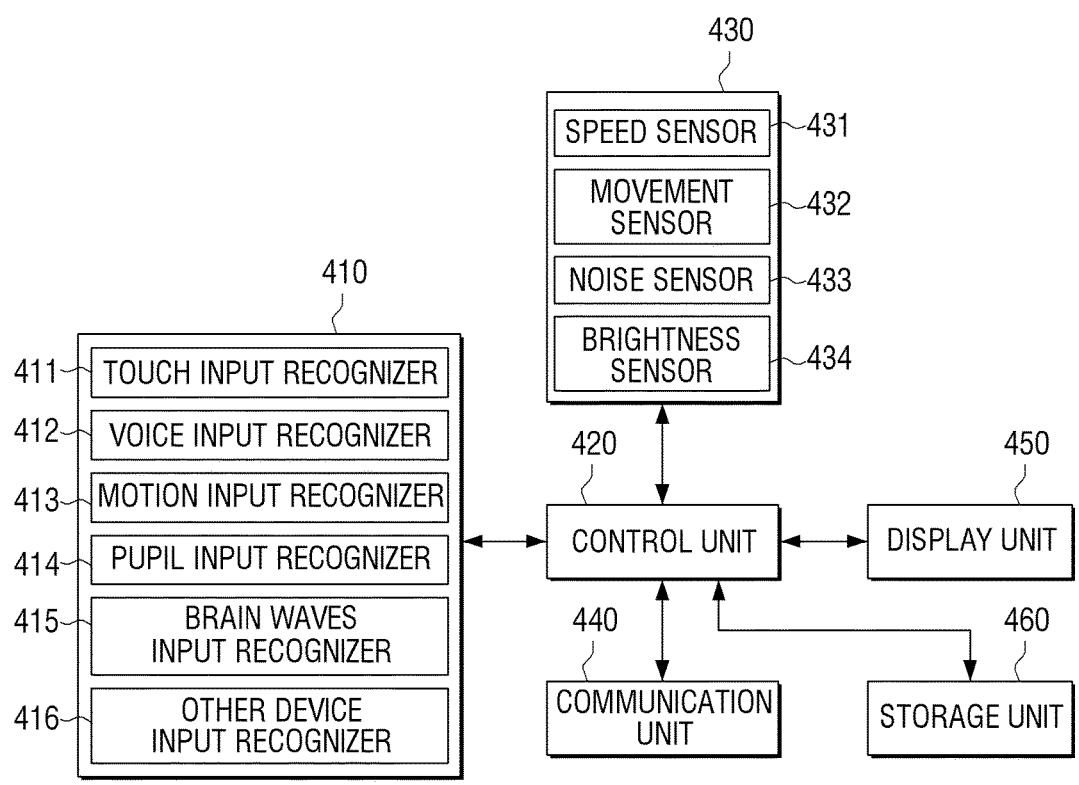
FIG. 24 is a block diagram showing the user terminal device of FIG. 23 in detail.

FIG. 24 is a block diagram showing the user terminal device of FIG. 23 in detail. Referring to FIG. 24, the user terminal device 400 can include one or more of a recognition unit 410, a controller 420, a sensor unit 430, a communication unit 440, a display unit 450 and a storage unit 460.

The controller 420 can control one or more of the recognition unit 410, the sensor unit 430, the communication unit 440, the display unit 450 and the storage unit 460.

In particular, the controller 420 can switch the GUI information set in the user terminal device 400 to second GUI information from first GUI information, based on at least one of the state information of a moving object and the environment information of a moving object.

For instance, a user would want to find a gas station if the fuel level of a moving object of the user is low. Also, a user might want to find one of the best restaurants near the current location of the moving object, or a user might want to visit a tourist attraction near the current location of the moving object. Depending on a destination of the moving object, a user might want to find one of the best restaurants near the destination, or a user might want to find a hotel or a place to stay near the destination. Depending on a travel distance, a user might want to find a route with less traffic, or a user might want to find a route with a better scenic view along the drive. In case of a bad weather condition, a user might want to take a route provided with more street lights, or a user might want to increase the brightness of a screen of the user terminal device 400, increase the volume, or use different input modes. In case of a good weather condition, a user might want to find a place for a picnic, near the current location of the moving object. If it is the nighttime, a user might want to make the screen brighter, and find a place with a scenic night view.

Accordingly, the controller 420 can switch the user interface mode set in the user terminal device 400 to a second user interface mode from a first user interface mode, based on the state and environment information of a moving object.

Also, the controller 420 can set GUI information of the user terminal device 400 to GUI information that is set through a UI window. For example, the user might want the GUI information to be set automatically based on the state and environment information of a moving object. The user might also want to set the GUI information manually depending on the situation or context of the terminal device. Accordingly, the controller 420 can set the GUI information of the user terminal device 400 to GUI information that is set manually by the user based on the situation or context of the terminal device.

The controller 420 can produce a user's manual setting data to correspond to the state and environment information of a moving object, by analyzing the GUI information set by the user. The user's manual setting data corresponds to a manual GUI information change pattern of the user that responds to switching of the GUI information of the user terminal device to second GUI information from first GUI information. For instance, if the user does not want the user terminal device 400 to operate with the second GUI information after the controller 420 has switched the GUI information to the second GUI information from the first GUI information based on the state and environment information of a moving object, the user can manually switch the GUI information to another GUI information. In this case, the controller 420 can produce a user's manual setting data, by analyzing the GUI information set by the user. The controller 420 can also accumulate the user's manual setting data in the storage unit 460, or update the data before storing in the storage unit 460.

The controller 420 can control the switching of the GUI information from the first GUI information to the second GUI information, using the accumulated user's manual setting data. For example, when the GUI information has been switched from the first GUI information to the second GUI information and if the user manually sets the GUI information to correspond to most of the accumulated user's manual setting data, the controller 420 can switch the existing GUI information to other GUI information corresponding to most of the accumulated user's manual setting.

When the GUI information has been switched from the first GUI information to the second GUI information, the controller 420 utilizes the updated user's manual setting data to switch the exiting GUI information to the most recently updated GUI information.

The controller 420 can control switching of the GUI information from the first GUI information to the second GUI information, by using the user's manual setting data.

Figure 25:
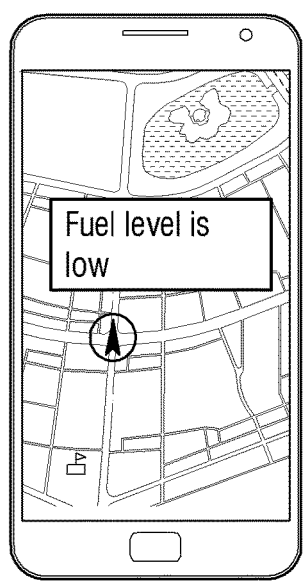
FIG. 25 to FIG. 27 illustrate a switching operation of the GUI information of the user terminal device according to an exemplary embodiment.
Figure 25:
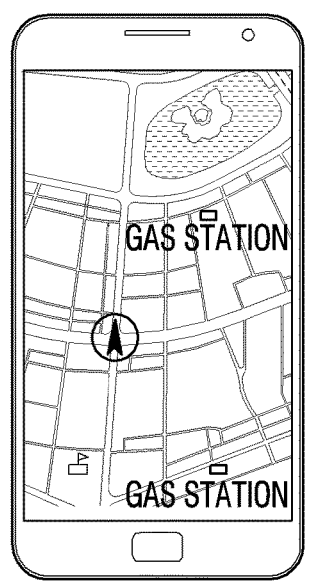

FIG. 25 illustrates a case where the GUI information is changed based on the state information of a moving object. When the fuel level is low as shown in FIG. 25 (*a*), the user may be notified by a displayed message. In this case, as shown in FIG. 25 (*b*), the controller 420 can set the GUI information such that any gas station located within the travel distance of a moving object along the route can be displayed. In this way, the user can easily locate a gas station within the travel distance along the route.

Figure 26:
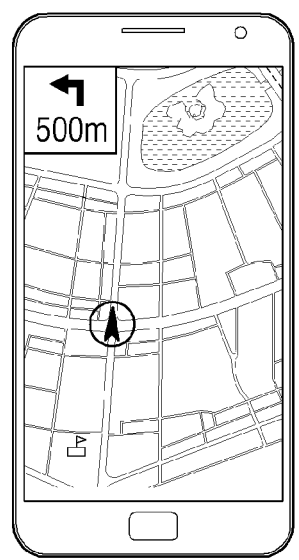
Figure 26:
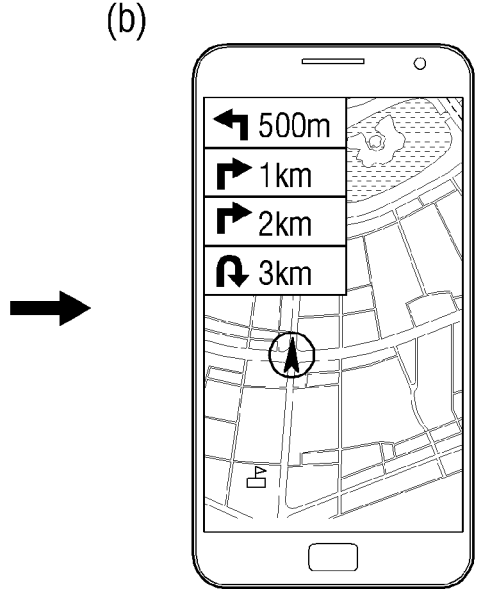

FIG. 26 illustrates a case where the GUI information is changed based on the environment information of a moving object. As shown in FIG. 26 (*a*), the user terminal device 400 can indicate the travel direction of a moving object. However, in case of a bad weather condition, or when the field of a view of a user is lowered, the controller 420 can set GUI information that indicates plural travel directions for the moving object. In this way, driving can be easier for the user because the travel directions are available in advance.

Figure 27:
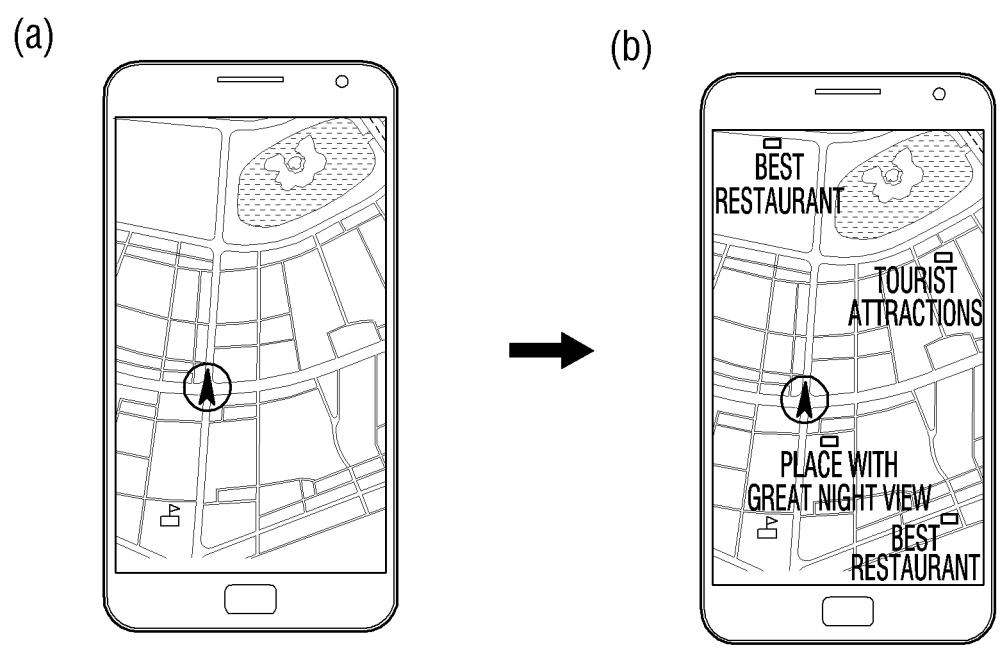

FIG. 27 illustrates a case where the GUI information is changed based on the state information of a moving object. As shown in FIG. 27 (*a*), the user terminal device can display a traveling path for the moving object. If the user has used the travel path many times, the user might be familiar with it. In this case, as shown in FIG. 27 (*b*), the controller 420 can set the GUI information in such a manner that useful information including best restaurants, tourist attractions, or places with a scenic night view are indicated, rather than particulars on the moving object's travel path itself. In this way, the user can easily obtain useful information about the places of interest in the frequently traveled area.

According to the user terminal device described above, user convenience can be improved by switching the GUI information set in the user terminal device, based on the moving state information of a moving object and the environment information of a moving object.

The control methods of a user terminal device according to exemplary embodiments described above can be implemented in program codes and saved in a variety of non-transitory computer readable media to be provided, in the saved state, to any server or equipment.

The non-transitory computer readable media refer to media that save data for a semi-permanent term, instead of for a short period of time as in a register, cache, memory or the like, and that are computer-readable. More specifically, those different applications or programs described above can be saved in a non-transitory computer readable medium, such as a CD, a DVD, a hard disk, a Blu-ray disk, a USB, a memory card, an ROM and the like, and become available for use.

What is claimed is:

1. A mobile device comprising:
   a first input user interface;
   a second input user interface;
   a third input user interface;
   a sensing device configured to sense an operating condition of the mobile device; and
   a controller configured to enable the first input user interface and disable the second input user interface if the operating condition corresponds to a first condition, enable the second input user interface and disable the first input user interface if the operating condition corresponds to a second condition different from the first condition, and enable the first input user interface and the second input user interface and disable the third input user interface if the operating condition corresponds to a third condition different from each of the first condition and the second condition,
   wherein the operating condition is at least one of an external environment of the mobile device and a motion of the mobile device, and
   wherein when the first input user interface and the second input user interface are inputted simultaneously, one of the first input user interface and the second input user interface is selected based on a preset priority level set by a user via a user interface for setting a priority level.

2. The mobile device as claimed in claim 1, wherein the third input user interface comprises one of a voice input, a touch input, an eye tracking input, a touch-less motion input and an external device input.

3. The mobile device as claimed in claim 1, further comprising:
   a display unit configured to display a window in which the first input user interface, the second input user interface and the third input user interface are assigned the priority level,
   wherein the controller selects the two of the first input user interface, the second input user interface and the third input user interface based on the priority level.

4. The mobile device as claimed in claim 1, further comprising:
   a communication unit configured to receive information about the external environment from an external device,
   wherein information about the external environment of the mobile device comprises at least one of information about a shaking movement of a moving object, information about a noise in a moving object, and information about a brightness in a moving object.

5. The mobile device as claimed in claim 1, wherein the external environment of the mobile device comprises at least one of a speed of a moving object, movement of a moving object, noise in a moving object, and brightness in a moving object.

6. The mobile device as claimed in claim 1, wherein the first input user interface comprises one of a voice input, a touch input, an eye tracking input, a touch-less motion input and an external device input, and
   wherein the second input user interface comprises one of a voice input, a touch input, an eye tracking input, a touch-less motion input and an external device input.

7. The mobile device as claimed in claim 1, further comprising:
   a display unit configured to display the first input user interface if the first input user interface is enabled and display the second input user interface if the second input user interface is enabled,
   wherein the first input user interface comprises a first graphical user interface element, and
   wherein the second input user interface comprises a second graphical user interface element larger than the first graphical user interface element.

8. The mobile device as claimed in claim 1, further comprising:
   a display unit configured to display the first input user interface if the first input user interface is enabled and display the second input user interface if the second input user interface is enabled,
   wherein the first input user interface comprises a first screen having a first brightness, and
   wherein the second input user interface comprises a second screen having a second brightness different from the first brightness.

9. The mobile device as claimed in claim 1, wherein the first input user interface outputs sound having a first volume, and
   wherein the second input user interface outputs sound having a second volume different from the first volume.

10. The mobile device as claimed in claim 1, further comprising:

a display unit configured to display the first input user interface if the first input user interface is enabled and display the second input user interface if the second input user interface is enabled, wherein the first input user interface comprises a first layout comprising a plurality of graphical user interface elements, and wherein the second input user interface comprises a second layout comprising most frequently used graphical user interface elements among the plurality of graphical user interface elements.

11. The mobile device as claimed in claim 1, wherein the operating condition of the mobile device comprises a condition indicating the mobile device is moving along with a moving object.

12. The mobile device as claimed in claim 1, further comprising:

a communication unit configured to receive user settings through short-range wireless communication, wherein the first condition and the second condition are determined based upon the received user settings.

13. The mobile device as claimed in claim 1, wherein the controller detects an override command of a user in response to the controller enabling the first input user interface or the second input user interface, generates pattern data corresponding to the override command of the user and modifies the first condition and the second condition based upon the pattern data.

14. A control method of a mobile device, the control method comprising:

sensing, by at least one sensing device, an operating condition of the mobile device;

enabling, by at least one processor, a first input user interface and disabling a second input user interface if the operating condition corresponds to a first condition;

enabling, by the at least one processor, the second input user interface and disabling at least the first input user interface if the operating condition corresponds to a second condition different from the first condition; and enabling, by the at least one processor, the first input user interface and the second input user interface and disabling a third input user interface if the operating condition corresponds to a third condition different from each of the first condition and the second condition, wherein the operating condition is at least one of an external environment of the mobile device and a motion of the mobile device, and wherein when the first input user interface and the second input user interface are inputted simultaneously, one of the first input user interface and the second input user interface is selected based on a preset priority level set by a user via a user interface for setting a priority level.

15. The control method as claimed in claim 14, wherein the third input user interface comprises one of a voice input, a touch input, an eye tracking input, a touch-less motion input and an external device input.

16. The control method as claimed in claim 14, further comprising:

displaying, on a display, a window where the first input user interface, the second input user interface and the third input user interface are assigned the priority level, selecting, by the at least one processor, the two of the first input user interface, the second input user interface and the third input user interface based on the priority level.

17. The control method as claimed in claim 14, further comprising:

receiving, by the at least one processor, information about the external environment from an external device, wherein information about the external environment of the mobile device comprises at least one of information about a shaking movement of a moving object, information about a noise in a moving object, and information about a brightness in a moving object.

18. The control method as claimed in claim 14, wherein the external environment of the mobile device comprises at least one of a speed of a moving object, movement of a moving object, noise in a moving object, and brightness in a moving object.

19. The control method as claimed in claim 14, wherein the first input user interface comprises one of a voice input, a touch input, an eye tracking input, a touch-less motion input and an external device input, and wherein the second input user interface comprises one of a voice input, a touch input, an eye tracking input, a touch-less motion input and an external device input.

20. The control method as claimed in claim 14, further comprising:

displaying, on a display, the first input user interface if the first input user interface is enabled and the second input user interface if the second input user interface is enabled, wherein the first input user interface comprises a first graphical user interface element, and wherein the second input user interface comprises a second graphical user interface element larger than the first graphical user interface element.

21. The control method as claimed in claim 14, further comprising:

displaying, on a display, the first input user interface if the first input user interface is enabled and the second input user interface if the second input user interface is enabled, wherein the first input user interface comprises a first screen having a first brightness, and wherein the second input user interface comprises a second screen having a second brightness different from the first brightness.

22. The control method as claimed in claim 14, wherein the first input user interface outputs a sound having a first volume, and wherein the second input user interface outputs a sound having a second volume different from the first volume.

23. The control method as claimed in claim 14, further comprising:

displaying, on a display, the first input user interface if the first input user interface is enabled and the second input user interface if the second input user interface is enabled, wherein the first input user interface comprises a first layout comprising a plurality of graphical user interface elements, and wherein the second input user interface comprises a second layout comprising only most frequently used graphical user interface elements from among the plurality of graphical user interface elements.

24. The control method as claimed in claim 14, wherein the operating condition of the mobile device comprises a condition indicating the mobile device is moving along with a moving object.

25. The control method as claimed in claim 14, further comprising:

receiving user settings through short-range wireless communication, wherein the first condition and the second condition are determined based upon the received user settings.

26. The control method as claimed in claim 14, further comprising:
   detecting, by the at least one processor, an override command of a user in response to the at least one processor enabling the first input user interface or the second input user interface;
   generating, by the at least one processor, pattern data corresponding to the override command of the user;
   storing, by the at least one processor, the pattern data; and
   modifying, by the at least one processor, the first condition and the second condition based upon the pattern data.

* * * * *